(12) United States Patent
Kozar et al.

(10) Patent No.: US 8,790,777 B2
(45) Date of Patent: Jul. 29, 2014

(54) COMPOSITE ARTICLES HAVING FIBERS WITH LONGITUDINALLY-VARYING GEOMETRY

(75) Inventors: Michael P. Kozar, Mercer Island, WA (US); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 16 days.

(21) Appl. No.: 13/450,823

(22) Filed: Apr. 19, 2012

(65) Prior Publication Data

US 2013/0280516 A1 Oct. 24, 2013

(51) Int. Cl.
*B32B 17/12* (2006.01)
*B32B 27/04* (2006.01)
*D02G 3/00* (2006.01)
*B23P 11/02* (2006.01)
*B29C 59/00* (2006.01)

(52) U.S. Cl.
USPC ............... 428/399; 428/293.4; 428/292.1; 428/297.4; 428/369; 29/446; 264/122

(58) Field of Classification Search
USPC .......... 442/335–337; 428/298.4, 362, 428/369–371, 397–400, 293.7–294.1, 428/295.4–295.7, 298.1–299.7; 89/908–909, 912–916
See application file for complete search history.

(56) References Cited

U.S. PATENT DOCUMENTS

| | | | |
|---|---|---|---|
| 5,134,024 A * | 7/1992 | Carrier | 428/295.7 |
| 5,482,776 A | 1/1996 | Nishiyama | |
| 6,060,163 A * | 5/2000 | Naaman | 428/397 |
| 6,340,522 B1 * | 1/2002 | Burke et al. | 428/359 |
| 6,454,989 B1 | 9/2002 | Neely | |
| 6,706,380 B2 * | 3/2004 | Edwards et al. | 428/292.1 |
| 7,261,945 B2 * | 8/2007 | Biermann et al. | 428/469 |
| 2005/0227564 A1 | 10/2005 | Bond | |
| 2012/0008806 A1 | 1/2012 | Kozar et al. | |
| 2012/0088063 A1 | 4/2012 | Kozar et al. | |
| 2012/0156418 A1 * | 6/2012 | Kozar et al. | 428/99 |

FOREIGN PATENT DOCUMENTS

EP 0447090 9/1991

OTHER PUBLICATIONS

U.S. Appl. No. 12/968,514, Controlled Fiber-Matrix Adhesion in Polymer Fiber Composites, filed Dec. 15, 2010.
U.S. Appl. No. 12/968,535, Fibers With Interlocking Shapes. Filed Dec. 15, 2010.
U.S. Appl. No. 12/968,557, Optimized Fiber Shapes for Improved Optical Performance, filed Dec. 15, 2010.
U.S. Appl. No. 12/969,532, Sandwiched Fiber Composites for Ballistic Applications, filed Dec. 15, 2010.
U.S. Appl. No. 12/968,575, Selectively Coupled Fibers in Composites, filed Dec. 15, 2010.
European Search Report for EP13164189.6 dated Aug. 13, 3013.

* cited by examiner

*Primary Examiner* — Jennifer Chriss
*Assistant Examiner* — Frank Vineis

(57) ABSTRACT

A composite article may include a matrix and a plurality of fibers embedded in the matrix. Each one of the fibers has a fiber length and a fiber geometry. The fiber geometry of at least a portion of the fibers may vary along the fiber length.

27 Claims, 16 Drawing Sheets

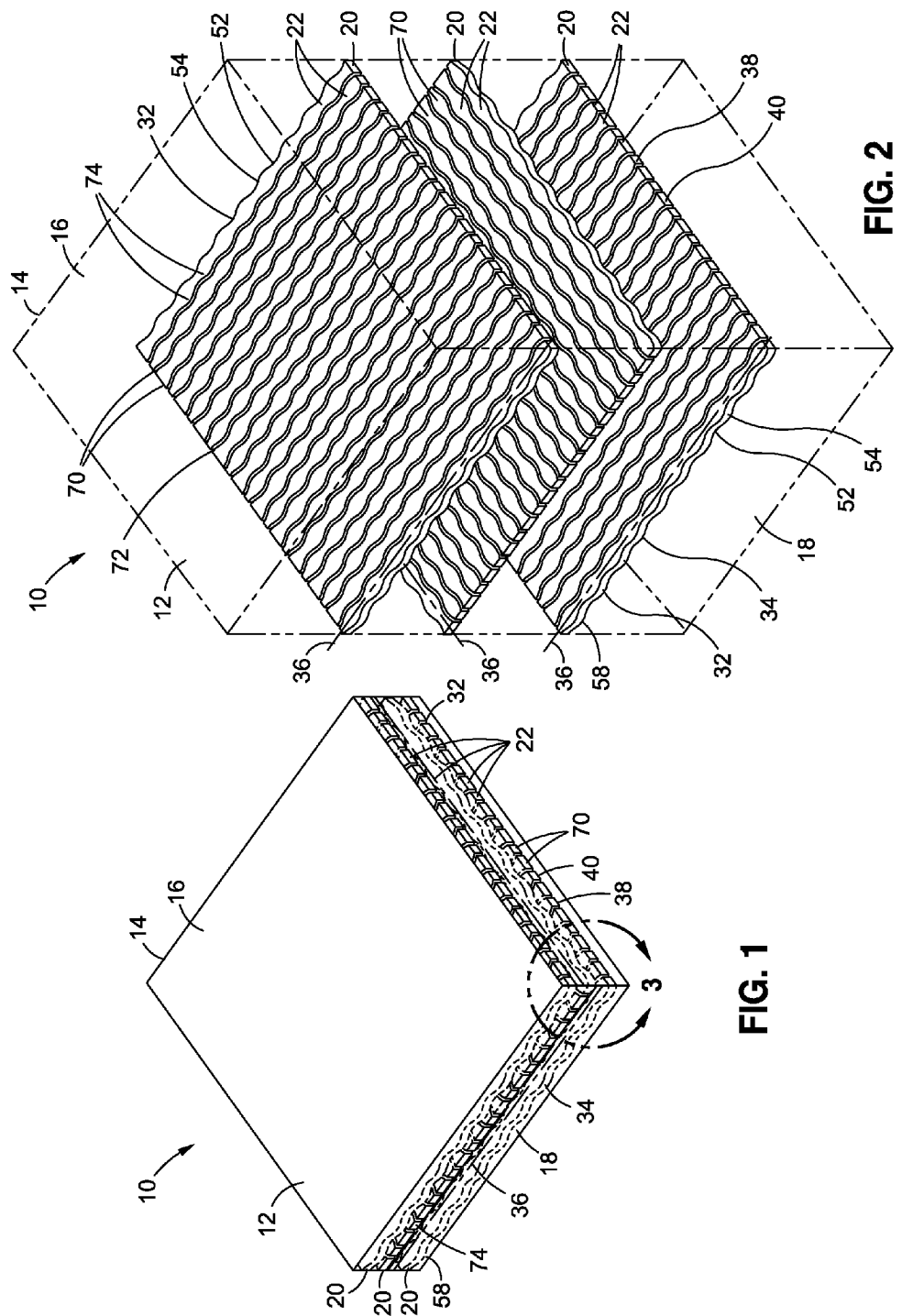

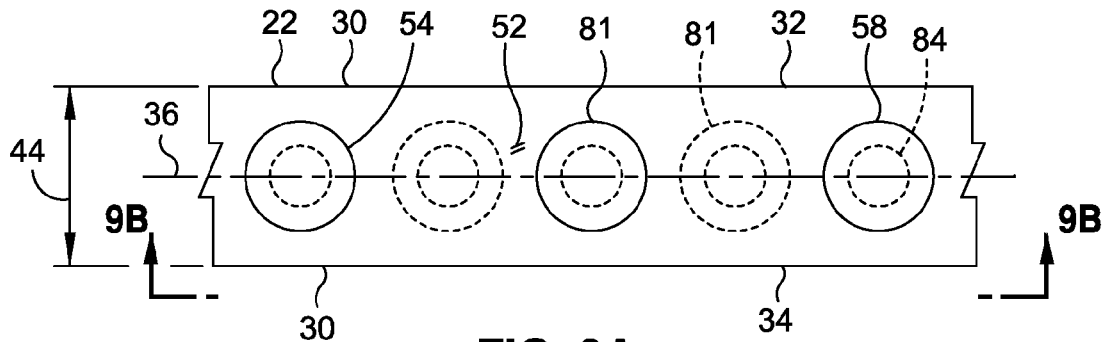
FIG. 9A
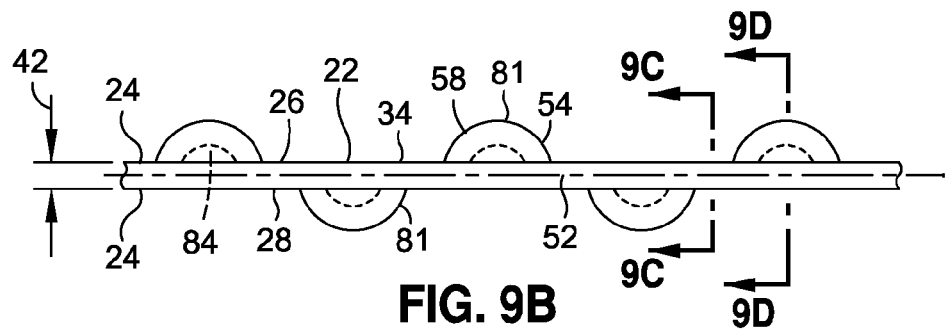
FIG. 9B
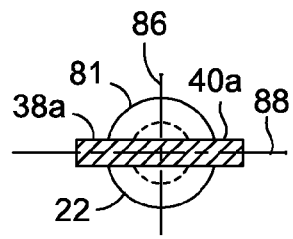  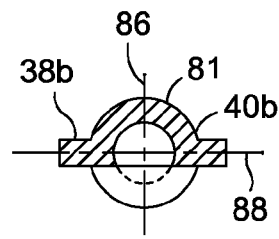
FIG. 9C                FIG. 9D

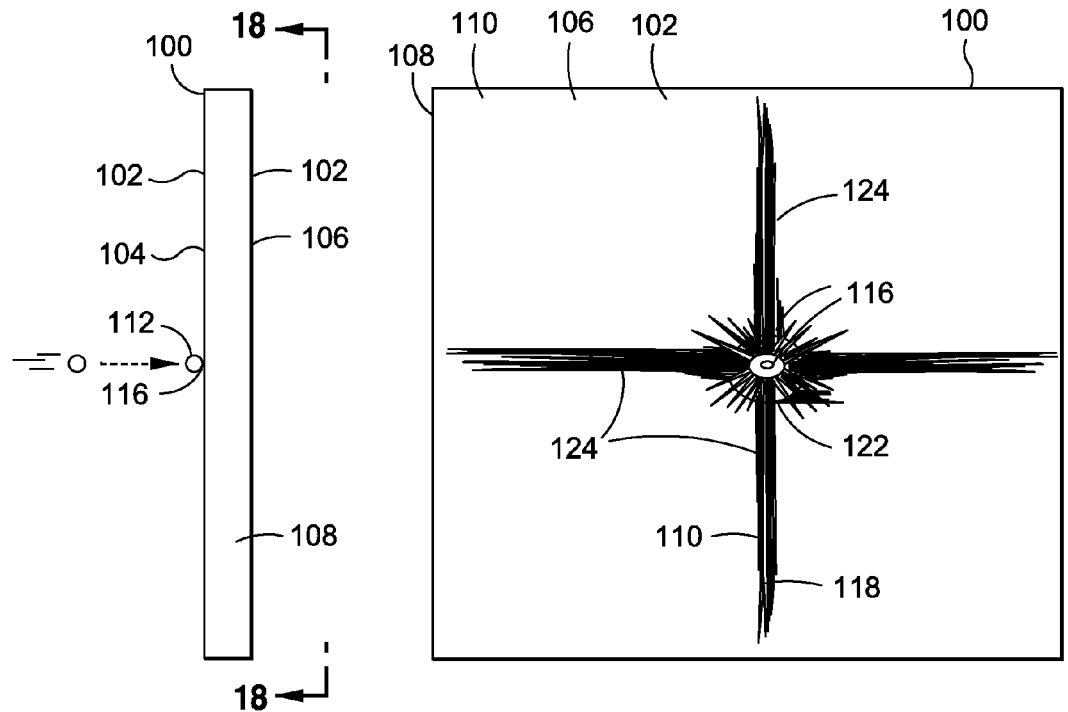
FIG. 17      FIG. 18
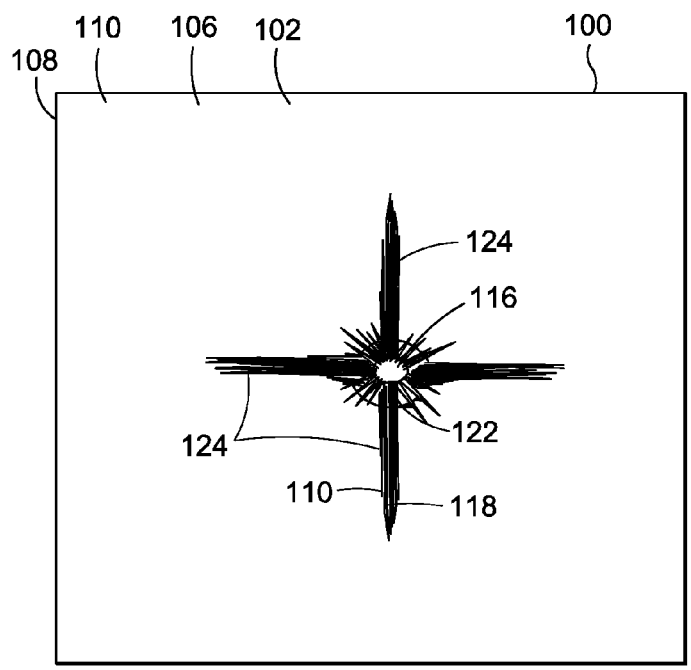
FIG. 19

COMPOSITE ARTICLES HAVING FIBERS WITH LONGITUDINALLY-VARYING GEOMETRY

FIELD

The present disclosure relates generally to composites and, more particularly, to fiber-reinforced composite articles having improved ballistic performance and optical performance.

BACKGROUND

Composite structures typically comprise a matrix reinforced with fibers wherein the fibers are embedded in the matrix. Composite structures are typically designed to transmit loads along the length of the fibers. Loads from one fiber may be transferred to another fiber in the same layer or to fibers in an adjacent layer by passing through the matrix material. However, the matrix is typically weaker than the fibers such that when a sufficiently high load is transmitted from one fiber to another fiber across the matrix, the matrix will fail. The failure of the matrix allows the fibers to move within the composite structure.

During a ballistic event wherein a composite panel is impacted by a projectile, the ability of the fibers to move within the matrix may affect the ballistic performance of the composite panel. For example, the ability of the fibers in the matrix to move may affect the resistance of the composite panel to penetration by the projectile. For transparent composite panels, movement of the fibers relative to the matrix may also affect the optical performance of the composite panel. In this regard, movement of the fibers relative to the matrix during a ballistic event may affect the size of the area having reduced optical performance as a result of impact by the projectile.

As can be seen, there exists a need in the art for a composite structure wherein the movement of the fibers in the matrix may be controlled such that the ballistic performance and the optical performance of the composite structure may be improved.

SUMMARY

The above-described needs associated with composite articles are specifically addressed and alleviated by the present disclosure which, in an embodiment, provides a composite article having a matrix and a plurality of fibers embedded in the matrix. Each one of the fibers has a fiber length and a fiber geometry. The fiber geometry of at least a portion of the fibers may vary along the fiber length.

In a further embodiment, disclosed is a method of manufacturing a composite article. The method may include the step of providing a plurality of fibers each having a fiber length and a fiber geometry. The method may further include the step of varying the fiber geometry along the fiber length for at least a portion of the fibers. The method may additionally include the step of embedding the fibers in a matrix.

Also disclosed is a method of loading a composite article such as composite panel of a vehicle. The method may include providing the composite article as a plurality of fibers embedded in a matrix wherein each one of the fibers has a fiber length and a fiber geometry and wherein the fiber geometry may vary along the fiber length. The method may include placing the composite article in a first state comprising a static loading condition. The method may also include placing the composite article in a second state comprising a dynamic loading condition.

Advantageously, the variation in the fiber geometry may enhance the mechanical coupling between the fibers and the matrix. The variation in the fiber geometry may also enhance the mechanical coupling between adjacent fibers. The mechanical coupling provided by the variation in the fiber geometry may provide a means to control fiber movement relative to the matrix. The mechanical coupling may also provide a means to control fiber slippage or movement of immediately adjacent fibers.

Controlling the slippage of the fibers may provide a means to control the portions of the fiber lengths of the fibers that are involved in an impact event. By controlling the length of the fibers involved in an impact event, the energy-absorbing capability of the fibers may be improved which may improve the ballistic performance and/or the optical performance of the composite article in response to impact by a projectile.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a perspective illustration of a composite article in an embodiment comprising a matrix and a plurality of fibers embedded in the matrix;

FIG. 2 is an exploded perspective illustration of the composite article of FIG. 1 and illustrating a plurality of layers of the fibers;

FIG. 9A is a top view of an alternative embodiment of a fiber having a series of protuberances extending along the fiber length;

FIG. 9B is a side view of the fiber taken from FIG. 9A and illustrating protuberances extending from upper and lower surfaces of the fiber;

FIG. 9C is a sectional view of the fiber taken from FIG. 9B and illustrating a first cross-sectional shape at a location of one of the protuberances;

FIG. 9D is a sectional view of the fiber taken from FIG. 8B and illustrating a second cross-sectional shape of the fiber in an area between the protuberances;

FIG. 17 is a side view of a test article and illustrating a projectile impacting a front side of the test article;

FIG. 18 is a view of a back side of the test article of FIG. 17 and illustrating a relatively large area of local and global involvement of the fibers due to a relatively small amount of fiber-to-matrix coupling and/or fiber-to-fiber coupling in response to the impact of the projectile against the front side of the test article;

FIG. 19 is a view of the back side of a test article and illustrating a relatively small area of local and global involvement of the fibers due to an increased amount of fiber-to-matrix coupling and/or fiber-to-fiber coupling relative to the embodiment shown in FIG. 18;

DETAILED DESCRIPTION

Figure 3:
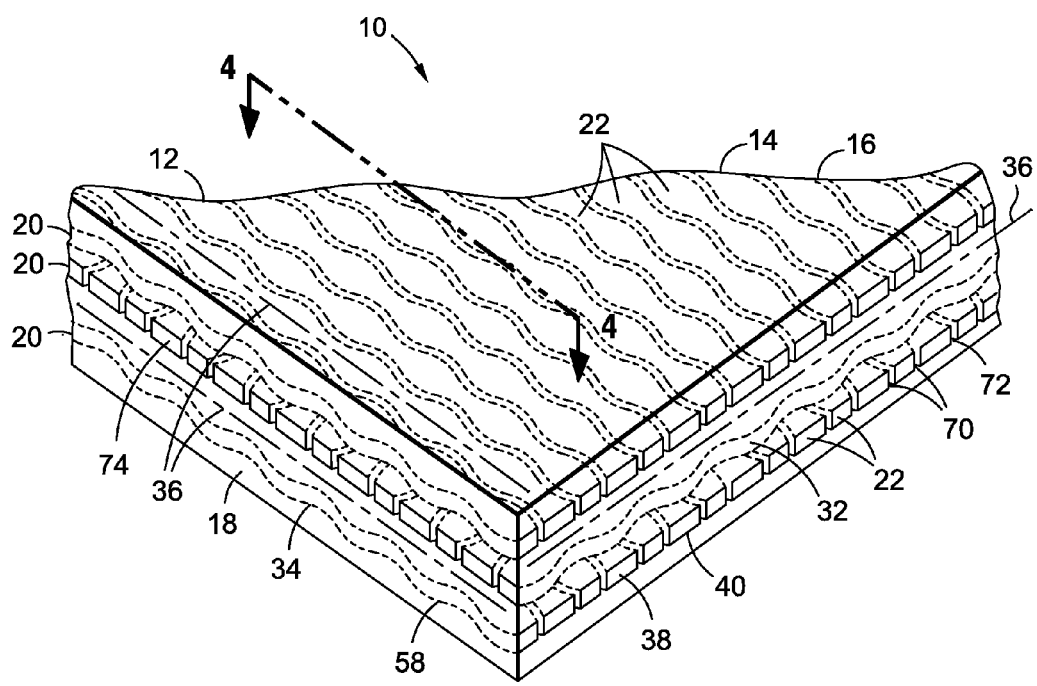
FIG. 3 is an enlarged perspective illustration of a portion of the composite article of FIG. 1 and illustrating the arrangement of the layers of fibers within the matrix and further illustrating variation in fiber geometry along the length of each one of the fibers.

Referring now to the drawings wherein the showings are for purposes of illustrating preferred and various embodiments of the disclosure, shown in FIG. 1 is a composite article 10. The composite article 10 may be fabricated as a fiber-reinforced composite panel 14 comprising a matrix 18 and a plurality of fibers 22 embedded within the matrix 18. Advantageously, the fibers 22 are provided with fiber geometry 32 that varies along the length of the fibers 22. The variation in fiber geometry 32 along the fiber length 34 of the fibers 22 may facilitate mechanical coupling between the fibers 22 and the matrix 18 (e.g., fiber-matrix coupling). The variation in fiber geometry 32 along the fiber length 34 of the fibers 22 may also facilitate mechanical coupling between adjacent fibers 22 (e.g., fiber-to-fiber coupling) in the same layer 20 and/or between fibers 22 in different layers 20.

The fiber-matrix mechanical coupling may provide a means to control the movement or slippage of the fibers 22 relative to the matrix 18. The fiber-to-fiber mechanical coupling may provide a means to control fiber-to-fiber movement or slippage. By varying the fiber geometry 32 along the length of the fibers 22, the portion of the fiber length 34 that is involved in an impact event may be controlled. Advantageously, varying the fiber geometry 32 along the fiber length 34 may improve the ability to decelerate a projectile impacting or entering the composite article 10.

The amount of slippage between the fibers 22 and the matrix 18 may also provide a means to control the failure of the fibers 22 as a function of distance or penetration of a projectile through the composite article 10. In this regard, the present disclosure advantageously provides the technical effect of controlling or selectively increasing the portion of the length of each fiber 22 that is involved in a ballistic event such that the tensile strain in each fiber 22 may be distributed through a relatively longer length of the fiber 22. By controlling (e.g., increasing) the portion of the length of the fibers 22 that are involved in a ballistic event, the total amount of energy absorbed by the fibers 22 during an impact event may be controlled (e.g., increased). In this regard, the tensile loads in the fibers 22 can be controlled as a means to prevent premature breakage of the fiber 22 upon the fibers 22 reaching the ultimate strain value.

Furthermore, by selectively varying the fiber geometry 32 along the fiber length 34, relative movement of the fibers 22 can be controlled as a means to control the amount of time that the fibers are involved in a ballistic impact event which may correlate to an increase in the amount of time that the fibers 22 have for decelerating a projectile and increasing the amount of projectile energy that may be absorbed by the fibers 22. The control of the slippage of the fibers 22 relative to the matrix 18 and relative to one another may also be affected or improved by forming the fibers 22 from materials having an appropriate ultimate strain value and/or an appropriate strain rate response as described in greater detail below. In this regard, the fibers 22 may be formed from materials having an ultimate strain that prevents failure of the fibers 22 while also resisting or preventing penetration of the composite article 10 by a projectile.

In FIG. 1, shown is the composite article 10 having articles surfaces 12. The composite article 10 is formed as a composite panel 14 having panel surfaces 16 and including a plurality of the fibers 22 embedded within a matrix 18. The fibers 22 may function as structural reinforcement for the matrix 18 and may improve the mechanical and ballistic performance of the composite article 10. In this regard, the fibers 22 may provide structural reinforcing to tailor the specific stiffness of the composite article 10 as a result of the enhanced tensile strength and targeted modulus of elasticity (e.g., stiffness) of the fibers 22. In the present disclosure, properties such as strength, strain, and stiffness are described in terms of dynamic or high strain rate properties.

In FIG. 2, shown is an exploded illustration of the composite article 10 or composite panel 14 of FIG. 1 and illustrating a plurality of layers 20. In each one of the layers 20, the fibers 22 are positioned in side-by-side 70 arrangement. Each fiber 22 has a fiber length 34 and a longitudinal axis 36. The fiber geometry 32 of the fibers 22 in each layer 20 may vary along the fiber length 34. The fiber geometry 32 may comprise the cross-sectional area 38 and the cross-sectional shape 40, either one of which or both of which may vary along the fiber length 34. The fibers 22 in each layer 20 may be generally aligned with one another wherein the longitudinal axes 36 of the fibers 22 in a given layer 20 are generally parallel. However, in any of the embodiments disclosed herein, the fibers 22 may be incorporated into woven lamina (not shown) in a matrix and are not limited to alignment in side-by-side relation to one another in a layer or substantially parallel relation to one another in a layer. Furthermore, any of the fiber 22 embodiments disclosed herein may be implemented in a fabric (not shown) without a matrix and wherein fiber-to-fiber coupling may provide advantages regarding penetration resistance of the fabric by a projectile in a manner similar to that which is described herein.

In an embodiment, the longitudinal axes 36 of the fibers 22 in one layer 20 may be oriented at an angle relative to the longitudinal axes 36 of the fibers 22 in an immediately adjacent one of the layers 20. For example, FIG. 2 illustrates the longitudinal axes 36 of the fibers 22 in one layer 20 being oriented perpendicularly relative to the longitudinal axes 36 of the fibers 22 in the layers 20 immediately adjacent thereto. However, the longitudinal axes 36 of the fibers 22 of adjacent ones of the layers 20 may be oriented at any angle relative to one another depending on the desired ply stack up of the composite article 10.

FIG. 3 is an enlarged view of a portion of the composite article 10 of FIG. 2 and illustrating several layers 20. Each one of the layers 20 includes fibers 22 having fiber geometry 32 that varies along the fiber length 34. As indicated above, the layers 20 may include fibers 22 oriented in any direction relative to the fibers 22 of an immediately adjacent layer 20. For example, FIG. 3 illustrates a cross-ply configuration wherein the fibers 22 of one layer 20 are oriented perpendicularly relative to the fibers 22 of the immediately adjacent layer 20. It should be noted that FIG. 3 is an illustration of a non-limiting embodiment of the composite article 10 and is not to be construed as limiting alternative arrangements of the fibers 22 within the matrix 18. For example, the fibers 22 in the layers 20 may be oriented in perpendicular orientation relative to the fibers 22 in other layers 20 as illustrated in FIG. 3 or the fibers 22 may be oriented in non-perpendicular orientation (e.g., 15°, 22.5°, 45°, 60°, 75°, etc.).

Figure 4:
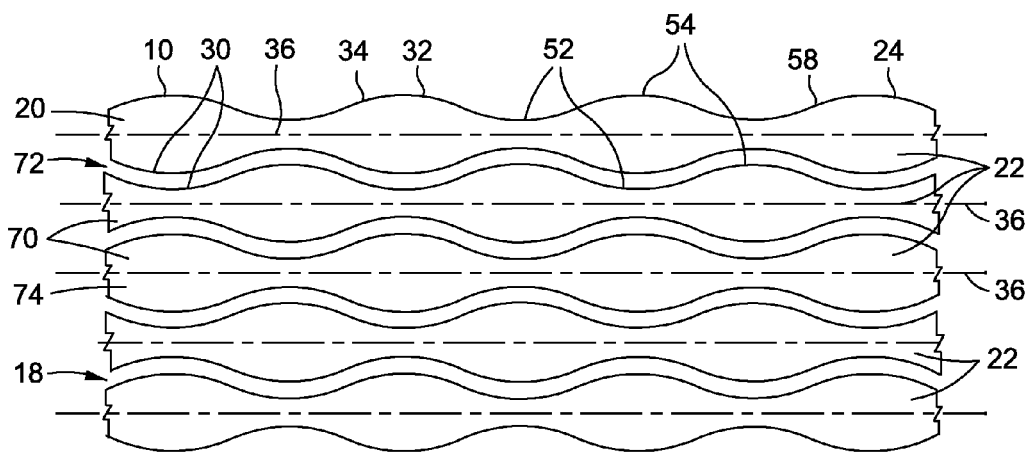
FIG. 4 is a top view of one of the layers of FIG. 3 illustrating variations in the fiber geometry along the fiber length.

FIG. 4 is a top view of a layer 20 of fibers 22 showing the variation in fiber geometry 32 along the fiber length 34 of the fibers 22. The fiber geometry 32 of a fiber 22 may be characterized by the cross-sectional area 38 (FIG. 3) of the fiber 22 at a given location along the fiber length 34 and/or by the cross-sectional shape of the fiber 22 at a given location along the fiber length 34. However, the fiber geometry 32 may be characterized by additional parameters including, but not limited to, the shape of the transition between a first portion 52 of the fiber 22 and a second portion 54 of the fiber 22. For example, the fiber geometry 32 may be characterized by a rounded or smoothly-radiused transition between first portions 52 and second portions 54 as shown in FIG. 4. Alternatively, the geometry may be characterized by relatively sharper or more abrupt transitions between first portions 52 and second portions 54 as shown in the embodiment of FIGS. 12A-12D and described below.

In FIG. 4, the fiber geometry 32 may vary in a periodic 58 manner along the fiber length 34. In this regard, the fiber 22 may include a series of the second portions 54 that may be distributed in a substantially uniform manner with substantially uniform spacing between the second portions 54. Each pair of second portions 54 may be separated by a first portion 52. The periodic 58 arrangement of fiber geometry 32 may comprise a substantially similar and repeating fiber geometry 32 along the fiber length 34. Although the present disclosure describes fiber geometry 32 that varies in a periodic 58 manner along the fiber length 34, fibers 22 may be provided having fiber geometry 32 that varies in a semi-periodic 64 (FIG. 15) manner. For example, the fiber geometry 32 may vary with progressively larger or smaller distances between adjacent pairs of second portions 54 such as a progressive or gradual increase or decrease in spacing between the second portions 54 of a fiber 22. In addition, the fiber geometry 32 may vary in repeated patterns (e.g., FIG. 15) along any portion of the fiber length 34 of a fiber 22. The fiber geometry 32 may also be arranged in a non-periodic or random (not shown) manner along the fiber length 34.

In FIG. 4, each fiber 22 is shown as being substantially similarly configured. The fibers 22 each have side surfaces 30 and are arranged such that a gap 72 is formed between adjacent fibers 22. Each one of the gaps 72 may be substantially filled with matrix 18 material when the fibers 22 are embedded within the matrix 18. The variation in fiber geometry 32 along the fiber length 34 of the fibers 22 may improve mechanical coupling of the fibers 22 with the matrix 18. In addition, as shown in FIG. 4, the fibers 22 may be arranged such that the second portions 54 of the fibers 22 are at least partially nested 74 with the first portions 52 of adjacent fibers 22. Advantageously, the at least partially nested relation of the fibers 22 may improve mechanical coupling of the fibers 22 (e.g., fiber-to-fiber coupling). As indicated above, mechanical coupling of the fibers 22 may reduce fiber-to-fiber slippage or movement which may provide a means to control the portion of the fiber length 34 that is involved in a ballistic event. In this regard, reduced fiber-to-fiber slippage may result in the involvement of a greater quantity of fibers 22 in a ballistic event. Increasing the quantity of fibers 22 involved in a ballistic event may increase the collective energy-absorbing capability of the fibers 22 which may improve the ballistic performance of the composite article 10 and/or the post-impact optical performance of the composite article 10 as described above.

Figure 5A:
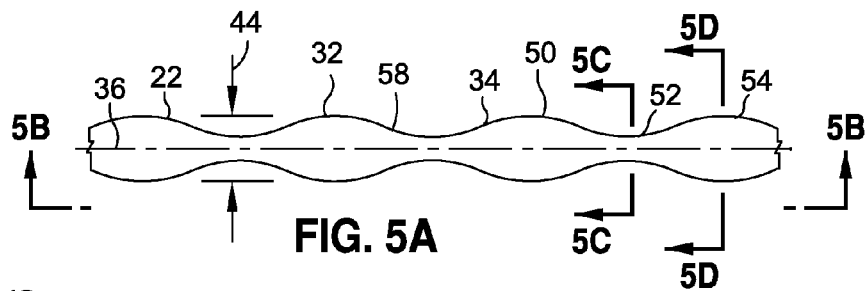
FIG. 5A is a top view of one of the fibers of FIG. 4 illustrating the fiber geometry variations which may comprise a series of first portions and second portions.

Referring to FIG. 5A, shown is a top view of one of the fibers 22 of FIG. 4. In the embodiment shown, the variation in fiber geometry 32 comprises first portions 52 and second portions 54 alternating in a periodic 58 manner along the fiber length 34. Although shown as having a generally symmetrical configuration relative to the longitudinal axis 36, it is contemplated that the fiber geometry 32 may be provided having an asymmetrical configuration (not shown) wherein the configuration of the fiber 22 on one side of the longitudinal axis 36 is different than the configuration of the fiber 22 on an opposite side of the longitudinal axis 36. The fiber 22 has a fiber width 44 which may be defined as the largest width of the fiber 22 at any location along the fiber length 34. In any of the fiber embodiments disclosed herein, the fiber geometry as illustrated may or may not be exaggerated for clarity.

Figure 5B:
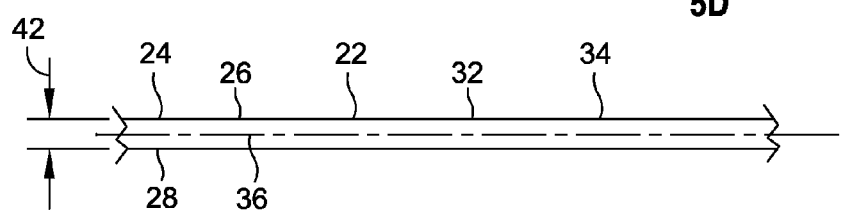
FIG. 5B is a side view of the fiber taken from FIG. 5A and illustrating a substantially flat cross-sectional shape of the fiber.

FIG. 5B is a side view of the fiber 22 of FIG. 5A. The fiber 22 may be provided in a generally flat configuration wherein the fiber 22 has an upper surface 26 and a lower surface 28 which are generally parallel to one another and which may define a fiber thickness 42 that may be generally constant along the fiber length 34. The fiber thickness 42 of a fiber 22 may be defined as being measured perpendicularly relative to the fiber width 44. The fiber 22 may be provided in an embodiment wherein the fiber 22 upper surface 26 and lower surface 28 are oriented in non-parallel relation to one another.

Figure 5C:
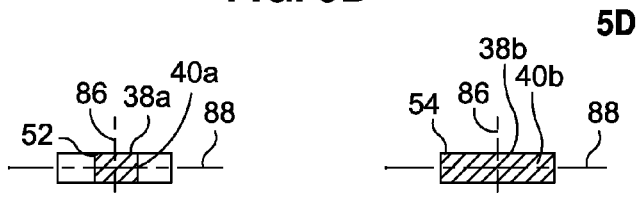
FIG. 5C is a sectional view of the fiber taken from FIG. 5A and illustrating a first cross-sectional shape of one of the first portions.
Figure 5D:
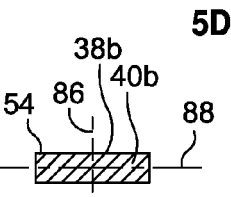
FIG. 5D is a sectional view of the fiber taken from FIG. 5A and illustrating a second cross-sectional shape of one of the second portions.

FIG. 5C is a cross section of the first portion 52 of the fiber 22 of FIG. 5A. The fiber geometry 32 (FIG. 5A) has a cross-sectional area 38 and a cross-sectional shape 40 (FIG. 3). In FIG. 5C, the first portion 52 of the fiber 22 has a first cross-sectional area 38*a* and a first cross-sectional shape 40*a* comprising a rectangular shape. The rectangular cross-sectional shape has a short transverse axis 86 and a long transverse axis 88. FIG. 5D illustrates the second portion 54 (FIG. 5A) having a second cross-sectional area 38*b* and a second cross-sectional shape 40*b* which may be similar to the rectangular first cross-sectional shape 40*a*. In this regard, FIGS. 5A-5D represent an embodiment of a fiber 22 (FIG. 5B) wherein the cross-sectional area 38 is variable along the fiber length 34 and the cross-sectional shape 40 is substantially constant (e.g., rectangular) along the fiber length 34 (FIG. 5A). The change in cross-sectional area 38 along the fiber length 34 of the fiber 22 of FIG. 5A is the result of an increase in the aspect ratio of the rectangular cross-sectional shape 40 along the long transverse axis 88. The embodiment of the fiber 22 illustrated in FIGS. 5A-5D may facilitate fiber-to-fiber mechanical coupling within an in-plane direction (e.g., within a layer).

Figure 6A:
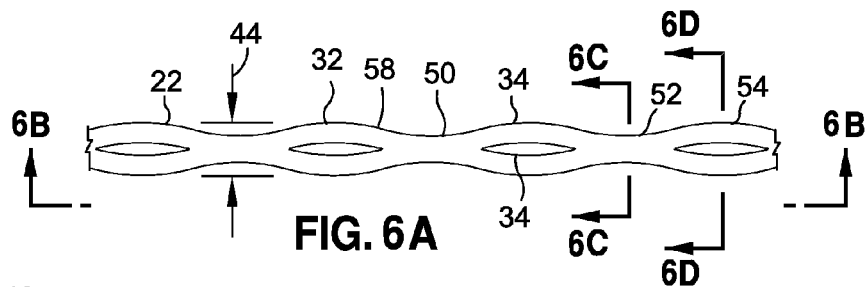
FIG. 6A is a top view of an alternative embodiment of a fiber having opening formed in the fiber.

Referring to FIG. 6A, shown it is a top view of one of the fibers 22 in an alternative embodiment wherein the fiber 22 includes alternating first and second portions 52, 54. The second portions 54 may include an opening 66 such as a hole or a slot extending at least partially or completely through the fiber 22. Advantageously, the second portions 54 of the fiber 22 may be configured such that the cross-sectional shape of the fiber 22 in the first portion 52 may vary along the fiber length 34 relative to the cross-sectional shape of the fiber 22 in the second portion 54. In addition, in the embodiment shown in FIG. 6A, the cross-sectional area of the fiber 22 in the second portion 54 may be substantially equivalent to the cross-sectional area of the fiber 22 in the first portion 52. The load-carrying capability (e.g., tensile load) of the fiber 22 may be limited to the load-carrying capability of the smallest cross-sectional area at any point along the length of the fiber 22. In FIG. 6A, the smallest cross-sectional area of the fiber 22 may be located in the first portion 52. By limiting the cross-sectional area of the second portion 54 to be substantially equivalent to the cross-sectional area of the first portion 52, any weight penalty associated with enlarged cross-sectional areas of the fiber 22 may be minimized.

Figure 6B:
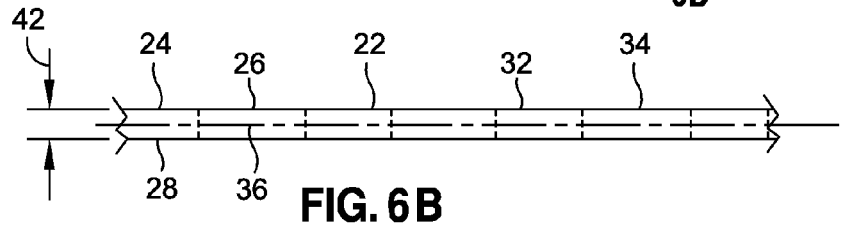
FIG. 6B is a side view of the fiber taken from FIG. 6A and illustrating a substantially flat cross-sectional shape of the fiber.

FIG. 6B is a side view of the fiber 22 of FIG. 6A. The fiber 22 may be provided in a generally flat configuration as described above for the fiber 22 embodiment of FIGS. 5A-5D. In this regard, the fiber 22 shown in FIG. 6A-6D may have a fiber thickness 42 that may be generally constant along the fiber length 34. However, the fiber 22 may be provided in an embodiment wherein the fiber 22 has a non-constant thickness.

Figures 6C, 6D:
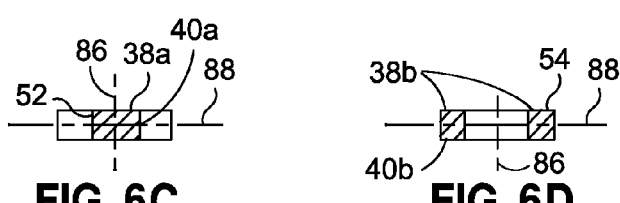
FIG. 6C is a sectional view of the fiber taken from FIG. 6A and illustrating a first cross-sectional shape of the fiber having a cross-sectional area.
FIG. 6D is a sectional view of the fiber taken from FIG. 6A and illustrating a second cross-sectional shape of the fiber having substantially the same total cross-sectional area as the cross-sectional area in FIG. 6C.

FIG. 6C is a cross section of the first portion 52 of the fiber 22 of FIG. 6A. The fiber geometry 32 at the first portion 52 comprises a first cross-sectional shape 40*a* represented by the cross-hatched rectangle and which encloses the first cross-sectional area 38*a*. FIG. 6D shows the second portion 54 having a second cross-sectional area 38*b* and a second cross-sectional shape 40*b*. The second cross-sectional shape 40*b* comprises the generally rectangular shape of the fiber 22 divided by the opening 66 between the two cross-hatched areas. The second cross-sectional shape 40*b* of the second portion 54 comprises the collective area of the pair of cross-hatched areas. The collective area of the pair of cross-hatched areas in FIG. 6D may be substantially equivalent to the cross-hatched area shown in FIG. 6C. In this regard, FIGS. 6A-6D illustrate one of many fiber embodiments that may be configured wherein the cross-sectional area 38 of the fiber 22 is substantially constant along the fiber length 34 (FIG. 6A) and the cross-sectional shape 40 is variable along the fiber length 34.

Figure 7A:
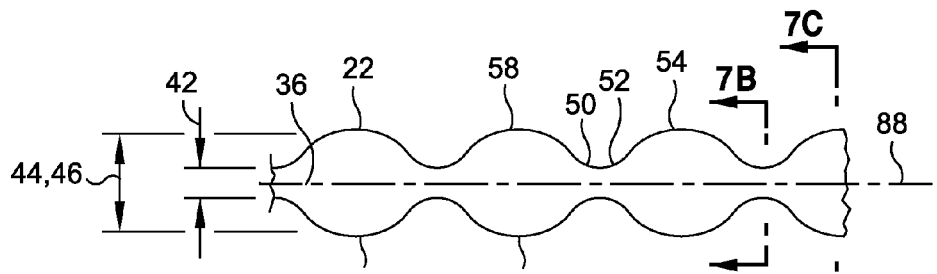
FIG. 7A is a top view of an alternative embodiment of a fiber comprising a series of first and second portions.
Figure 15:
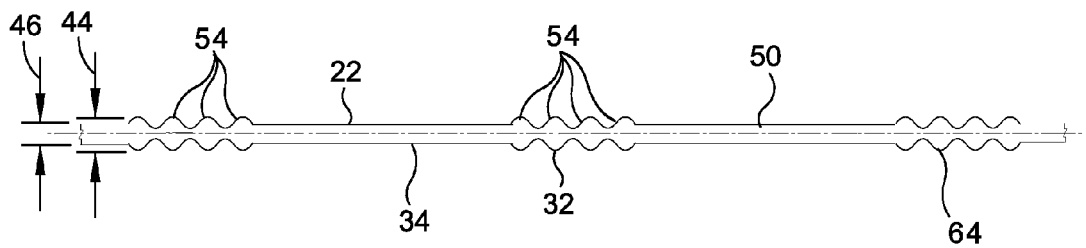
FIG. 15 is a side view of a fiber having fiber geometry that varies in a semi-periodic manner.

Referring to FIG. 7A, shown is an embodiment of a fiber 22 having fiber geometry 32 that varies along the fiber length 34. The fiber geometry 32 is comprised of a series of first portions 52 and second portions 54 that alternate relative to one another. The first portions 52 and second portions 54 are shown as being arranged in a periodic 58 manner along the fiber length 34. However, as indicated above, the fiber geometry 32 may be arranged in a semi-periodic 64 manner as shown in FIG. 15 and described below. The fiber geometry 32 may also be arranged to vary in a non-periodic manner.

Figure 7B:
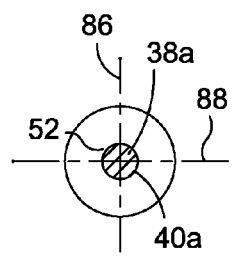
FIG. 7B is a sectional view of the fiber taken from FIG. 7A and illustrating a first cross-sectional shape of one of the first portions.
Figure 7C:
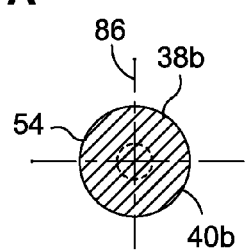
FIG. 7C is a sectional view of the fiber taken from FIG. 7A and illustrating a second cross-sectional shape of one of the second portions.

As shown in FIG. 7B, the fiber 22 has a first cross-sectional area 38a and a first cross-sectional shape 40a comprising a circular shape and representing a first portion 52 of the fiber 22 (FIG. 7A). FIG. 6C illustrates a second portion 54 (FIG. 7A) of the fiber 22 having a second cross-sectional area 38b and a second cross-sectional shape 40b also comprising a circular shape. FIGS. 7A-7C illustrate a fiber 22 embodiment having a varying cross-sectional area 38 (FIG. 7C) along the fiber length 34 (FIG. 7A) and a substantially constant cross-sectional shape 40 along the fiber length 34. The change in cross-sectional area 38 in FIG. 7B-7C may be the result of a radially-uniform increase or enlargement in the size of the circular cross-sectional shape 40.

In an embodiment, the second portions 54 (FIG. 7A) of the fiber 22 may have a second cross-sectional area 38b (FIG. 7C) that is no more than approximately 50 percent larger than the first cross-sectional area 38a (FIG. 7B) of the first portions 52 (FIG. 7A). However, the fiber 22 may be provided in embodiments wherein the second portions 54 have a second cross-sectional area 38b that is greater than approximately 50 percent of the first cross-sectional area 38a of the first portions 52. In the present disclosure, the second cross-sectional area 38b of each second portion 54 encompasses, circumscribes, or otherwise includes the first cross-sectional area 38a of the first portion 52 or the fiber core 50 (FIG. 7A). As indicated above, the load-carrying capability (e.g., tensile load) of the fiber 22 is defined by the load-carrying capability of the smallest cross-sectional of the fiber 22 which may be located at the first portion 52. By limiting the size of the second portions 54, the weight penalty and/or economic penalty associated with the non load-carrying portion of the fiber 22 may be minimized.

Advantageously, the fiber 22 embodiment illustrated in FIGS. 7A-7C may facilitate fiber-to-fiber mechanical coupling within an in-plane direction (e.g., within a layer) and also fiber-to-fiber mechanical coupling within an out-of-plane direction (e.g., between layers). Although not shown, out-of-plane mechanical coupling of fibers 22 may be facilitated by nesting engagement of the second portions 54 of the fibers 22 in one layer 20 with first portions 52 of the fibers 22 in the layers 20 immediately adjacent thereto.

Figure 8A:
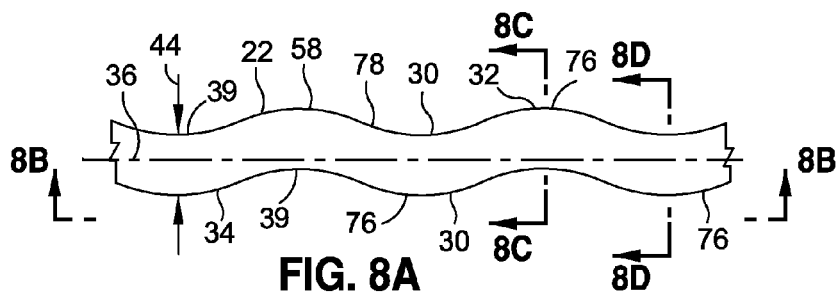
FIG. 8A is a top view of an alternative embodiment of a fiber having a serpentine shape.
Figure 8B:
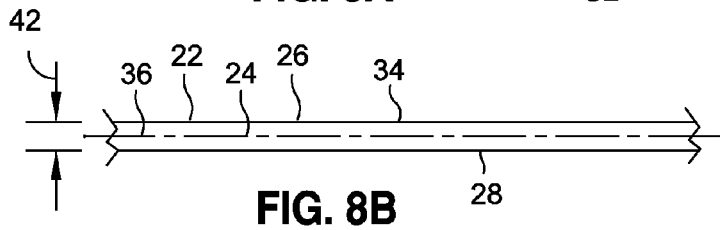
FIG. 8B is a side view of the fiber taken from FIG. 8A and illustrating a substantially flat cross-sectional shape of the fiber.

Referring to FIG. 8A, shown is a top view of an embodiment of a fiber 22 having a serpentine shape 78. The fiber 22 may have a cross-sectional area 38 that may be offset relative to the longitudinal axis 36 at different locations 39 along the fiber length 34. In an embodiment, the fiber 22 may have a fiber width 44 that is generally constant along the fiber length 34 although the fiber 22 may be provided with a fiber width 44 that is generally variable along the fiber length 34. As shown in FIG. 8B, the fiber 22 has upper and lower surfaces 26, 28 which are generally parallel to one another and defining a fiber thickness 42 that may be generally constant. However, as was indicated above, the fiber 22 may be provided in an embodiment wherein one or more of the fiber surfaces 24 are oriented in non-parallel relation to one another. In an embodiment, a plurality of the fibers 22 shown in FIG. 8A may be arranged in side-by-side arrangement (not shown) to form a layer wherein offsets 76 of the fibers 22 may be at least partially nested with one another to provide fiber-to-fiber coupling.

Figure 8C:
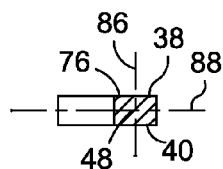
FIG. 8C is a sectional view of the fiber taken from FIG. 8B and illustrating a cross-sectional shape having an area centroid of the fiber being offset from one side of a longitudinal axis of the fiber.
Figure 8D:
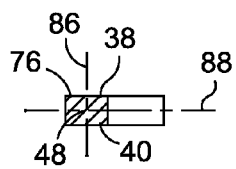
FIG. 8D is a sectional view of the fiber taken from FIG. 8B and illustrating the area centroid being offset from the longitudinal axis on a side thereof opposite the area centroid shown in FIG. 8C.

FIG. 8C is a sectional view of the fiber 22 (FIG. 8B) illustrating a rectangular cross-sectional area 38 of the fiber 22. The cross-sectional area 38 defines an area centroid 48 which may be offset 76 on one side or both sides of the longitudinal axis 36 (FIG. 8C) of the fiber 22. FIG. 8D is a further sectional view of the fiber 22 illustrating the rectangular cross-sectional area 38 of the fiber 22 having an area centroid 48 that is offset 76 on one side of the longitudinal axis 36 relative to the offset 76 of the area centroid 48 shown in FIG. 8C. The fiber 22 in FIGS. 8A-8D has a substantially constant cross-sectional area 38 and a substantially constant cross-sectional shape 40 (FIG. 7C) along the fiber length 34. Although the offset 76 is periodic 58 (FIG. 8A) along the fiber length 34 on alternating sides of the longitudinal axis 36, the offset 76 on opposite sides of the longitudinal axis 36 may be semi-periodic or non-periodic as described above. Furthermore, the offset 76 is not limited to being offset 76 in a single direction such as along the long transverse axis 88 as shown in FIGS. 8C-8D but may be offset 76 in one or more of a variety of different directions including in a short transverse axis 86 direction, or in any one of a variety of different directions.

Referring to FIG. 9A, shown is a top view of an embodiment of a fiber 22 having a series of substantially equally-sized and configured protuberances 81 formed along the fiber length 34. The protuberances 81 are shown as being generally centered along the longitudinal axis 36. However, the protuberances 81 may be provided in any location relative to the longitudinal axis 36. Although the fiber 22 is shown as having side surfaces 30 that are generally straight, the fiber 22 may be provided in any shape such as in a serpentine shape 78 as shown in FIG. 8A or in any other shape, without limitation.

FIG. 9B is a side view of the fiber 22 of FIG. 9A showing a fiber thickness 42 that is generally constant along the fiber length 34. The protuberances 81 are shown as extending from both the upper surface 26 and the lower surface 28 of the fiber 22 in an alternating manner. However, the protuberances 81 may be formed on a single one of the upper and lower surfaces 26, 28. Alternatively, the protuberances 81 may be formed on the upper and lower surface 26, 28 in a non alternating pattern (not shown). In the embodiment shown, the protuberances 81 are each shown as optionally including a hollow portion 84 which may be open to an exterior of the fiber 22 such that the protuberances 81 may have holes to reduce the overall weight of the composite article 10 (FIG. 4) containing the fibers 22.

FIG. 9C is a sectional view of the fiber 22 taken along a portion of the fiber 22 between a pair of protuberances 81. As indicated by the crosshatched area, the fiber geometry 32 has a first cross-sectional area 38a defined by a first cross-sectional shape 40a formed as a rectangle. FIG. 9D is a sectional view of the fiber 22 passing through one of the protuberances 81. The fiber geometry 32 at the noted location has a second cross-sectional area 38b and a second cross-sectional shape 40b formed in the shape of an arch. The second cross-sectional area 38b may be larger than the first cross-sectional area 38a (FIG. 9C). The protuberances 81 may facilitate mechanical coupling with the matrix 18 (FIG. 4). In addition, although not shown, the protuberances 81 in one layer 20 of fibers 22 may be sized and configured to nest within the hollow portions 84 (FIG. 9B) of the protuberances 81 in fiber 22 of an immediately adjacent layer 20 (FIG. 4). Such nesting of the protuberances 81 may facilitate fiber-to-fiber mechanical coupling in an out-of-plane direction (e.g., between layers 20) which may facilitate an increase in the quantity of fibers 22 involved in a ballistic event.

Figure 10A:
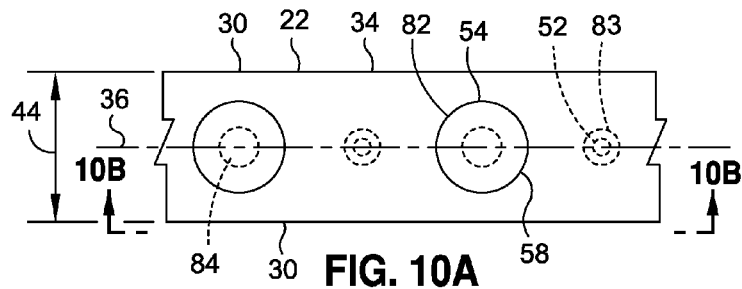
FIG. 10A is a top view of an alternative embodiment of a fiber having a series of relatively large protuberances and relatively small protuberances extending along the fiber length.
Figure 10B:
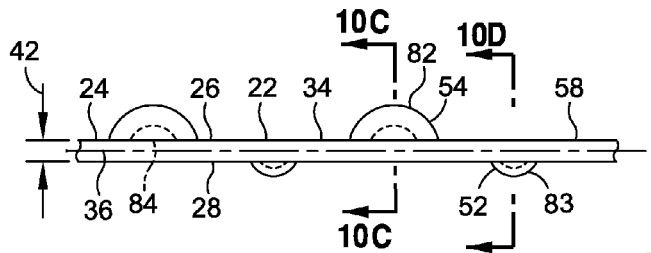
FIG. 10B is a side view of the fiber taken from FIG. 10A and illustrating the relatively large protuberances and the relatively small protuberances extending from upper and lower surfaces of the fiber.
Figure 10C:
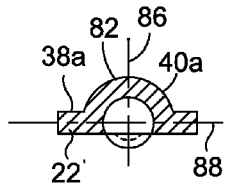
FIG. 10C is a sectional view of the fiber taken from FIG. 10B and illustrating a cross-sectional shape at a location of one of the relatively small protuberances.
Figure 10D:
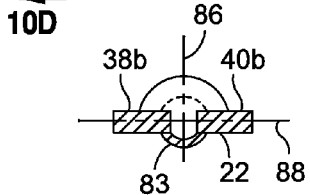
FIG. 10D is a sectional view of the fiber taken from FIG. 10B and illustrating a cross-sectional shape at a location of one of the relatively large protuberances.

FIG. 10A is a top view of an embodiment of a fiber 22 having a series of relatively large protuberances 82 and relatively small protuberances 83 formed along the fiber length 34. FIG. 10B is a side view of the fiber 22 showing the relatively large protuberances 82 formed on the upper surface 26 and the relatively small protuberances 83 formed on the lower surface 28. FIG. 10C is a sectional view of the fiber 22 passing through one of the relatively small protuberances 83 wherein the crosshatched area represents a first cross-sectional area 38a formed in the shape of an arch. FIG. 10D is a sectional view of the fiber 22 passing through one of the relatively large protuberances 82 wherein the crosshatched area represents a second cross-sectional area 38b also formed in the shape of an arch. By providing the fiber 22 with different sized protuberances on the upper surface 26 and lower surface 28, different levels of mechanical coupling may be provided with the matrix 18 and/or with other fibers 22.

Figure 11A:
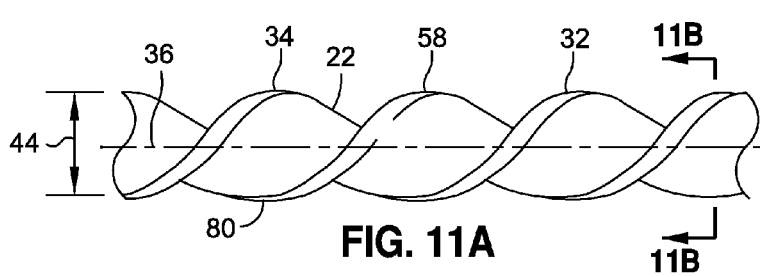
FIG. 11A a is a top view of an alternative embodiment of a fiber formed in a helix shape.
Figure 11B:
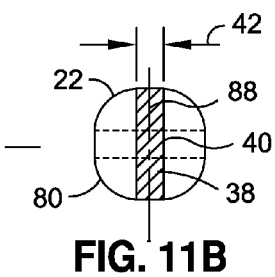
FIG. 11B is a sectional view of the fiber taken from FIG. 11A and illustrating the helix shape.

FIGS. 11A-11B illustrate an embodiment of a fiber 22 formed in a helix shape 80. The fiber geometry 32 has a cross-sectional shape 40 having a long transverse axis 88. The orientation of the long transverse axis 88 of the cross-sectional shape 40 varies along the fiber length 34 when the fiber 22 is viewed along a direction parallel to the fiber length 34. In the embodiment shown, the cross-sectional area 38 and/or the cross-sectional shape 40 of the fiber 22 may be substantially constant along the fiber length 34. However, the fiber 22 may be provided in an embodiment wherein the cross-sectional area 38 and/or the cross-sectional shape 40 may vary (not shown) along the fiber length 34. In the embodiment shown, the orientation of the long transverse axis 88 changes in a continuous direction such as a clockwise direction or a counterclockwise direction, depending upon the direction along which the fiber 22 is viewed. The fiber 22 is shown as having a helix shape 80 wherein the orientation of the long transverse axis 88 changes at a constant rate along the fiber length 34. However, the fiber 22 may be configured such that the orientation of the long transverse axis 88 changes at a variable or random rate. The orientation of the long transverse axis 88 may also alternate back-and-forth (FIGS. 11C-11D) along the fiber length 34 and is not limited to changing in a constant clockwise (or counterclockwise) direction of a helix shape 80.

Figure 11C:
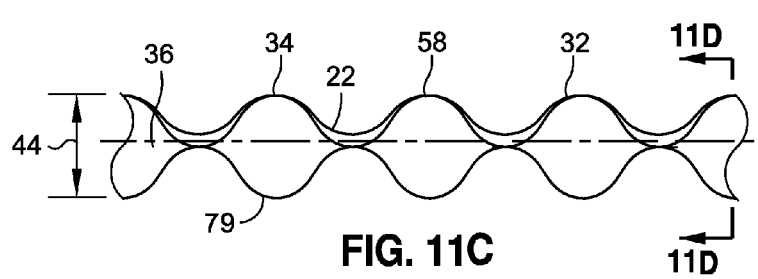
FIG. 11C is a top view of a further alternative embodiment of a fiber formed in a back-and-forth twisting shape.
Figure 11D:
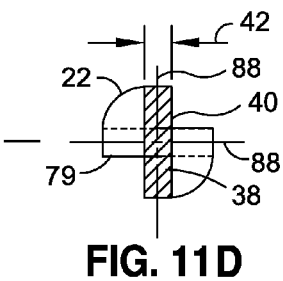
FIG. 11D is a sectional view of the fiber taken of FIG. 11C and illustrating the back-and-forth twisting shape.

FIG. 11C-11D illustrates an embodiment of the fiber 22 formed in a back-and-forth twisting shape 79. The fiber geometry 32 has a cross-sectional shape 40 that has a long transverse axis 88 (FIG. 11D) for which the orientation twists back-and-forth along the fiber length 34 (FIG. 11C) when the fiber 22 is viewed along a direction parallel to the fiber length 34. For example, in the embodiment shown, the transverse axis 88 twists back-and-forth approximately 90 degrees along the fiber length 34. However, the fiber 22 may be configured such that the transverse axis 88 twists back-and-forth by any angular amount. The fiber 22 embodiments in FIGS. 11A-11D may have a substantially constant cross-sectional area 38 along the fiber length 34. Advantageously, because the load-carrying capability of a fiber is generally defined by the load-carrying capability of the smallest cross-sectional area at any point along the length of a fiber, the substantially constant cross-sectional area 38 of the fiber 22 embodiments of FIGS. 11A-11D minimizes any weight penalties otherwise associated with fibers having enlarged cross-sectional areas along the fiber length.

Figure 12A:
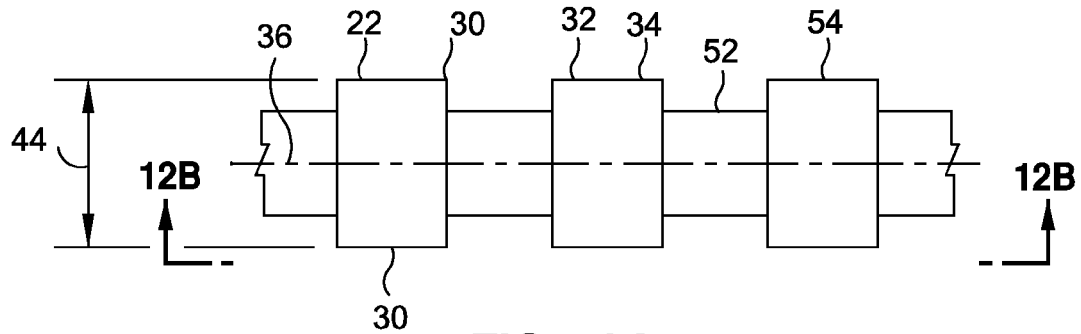
FIG. 12A is a top view of an alternative embodiment of a fiber having a series of first and second portions having an orthogonal cross-sectional shape.
Figure 12B:
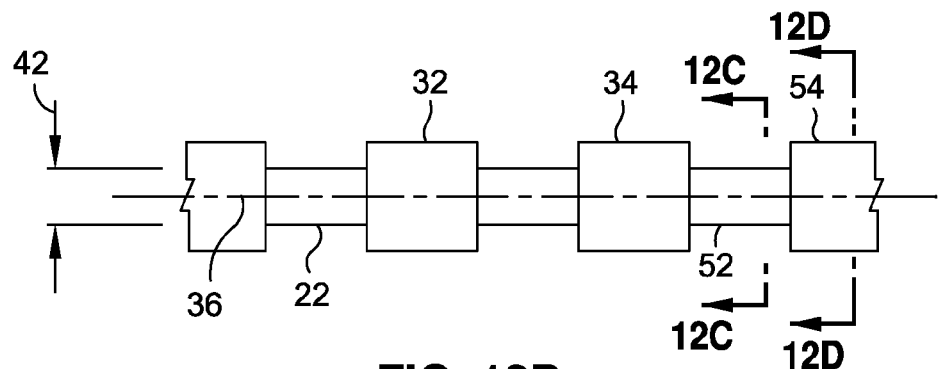
FIG. 12B is a side view of the fiber taken from FIG. 12A and illustrating the first and second portions.
Figure 12C:
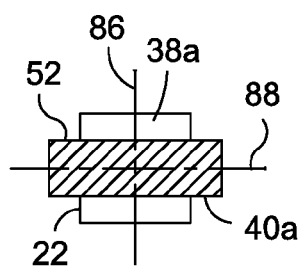
FIG. 12C is a sectional view of the fiber taken from FIG. 12B and illustrating a first cross-sectional shape at a location of one of the first portions.
Figure 12D:
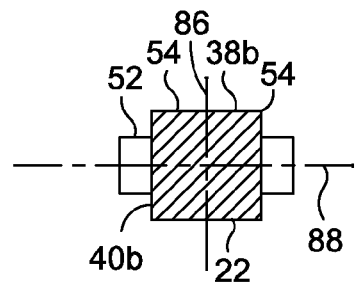
FIG. 12D is a sectional view of the fiber taken from FIG. 12B and illustrating a second cross-sectional shape at a location of one of the second portions.

FIG. 12A is a top view of an embodiment of a fiber 22 having a cross-sectional shape 40 that is substantially constant along the fiber length 34 and a cross-sectional area 38 that varies along the fiber length 34. The fiber 22 is shown as having generally periodic 58 variations in fiber geometry 32 in the form of periodic 58 changes in cross-sectional shape 40 and cross-sectional area 38 along the fiber length 34. However, as indicated above, the fiber 22 may be configured such that the changes in the cross-sectional shape 40 and cross-sectional area 38 are semi-periodic or non-periodic. FIG. 12B is a side view of the fiber 22 illustrating changes in fiber geometry 32 along the fiber length 34. FIG. 12C is a sectional view of the fiber 22 having a first cross-sectional area 38a and a first cross-sectional shape 40a that is generally rectangular. FIG. 12D is a sectional view of the fiber 22 taken at a location along the fiber length having a second cross-sectional area 38b and a second cross-sectional shape 40b that is generally square. The first cross-sectional area 38a and the second cross-sectional area 38b may be substantially equivalent in the embodiment shown. However, as was indicated above, the cross-sectional area 38 may be variable along the fiber length 34.

Figure 13A:
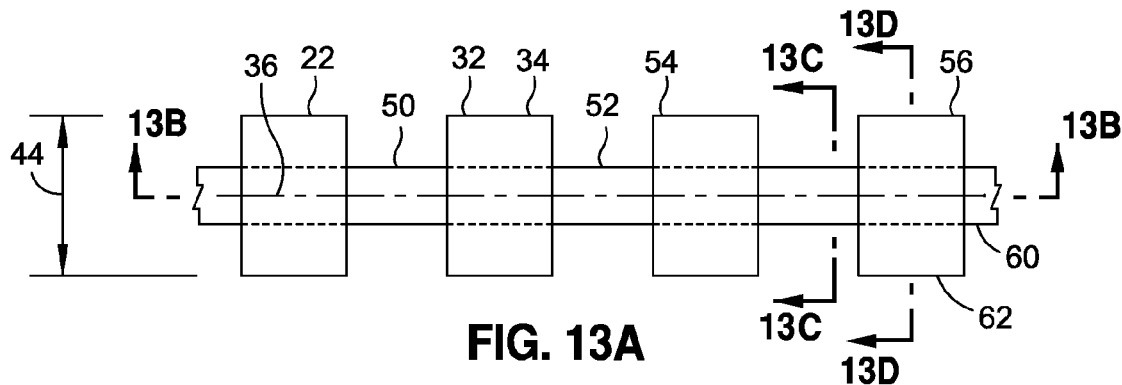
FIG. 13A is a top view of an alternative embodiment of a fiber having a fiber core formed of a first material and a series of cube-shaped second portions formed of a second material.
Figure 13B:
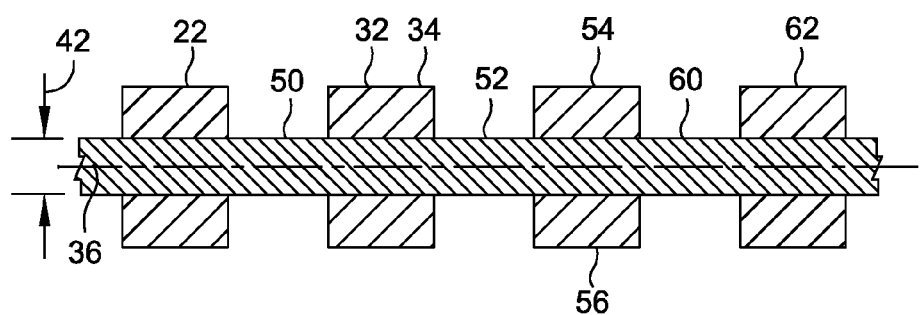
FIG. 13B is a side view of the fiber taken from FIG. 13A and illustrating the fiber core extending through the series of views of the cube-shaped second portions.
Figure 13C:
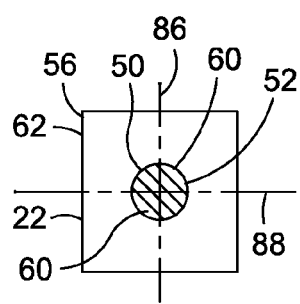
FIG. 13C is a sectional view of the fiber taken from FIG. 13B and illustrating the fiber core formed of the first material.

Referring to FIG. 13A, shown is a top view of a fiber 22 comprised of a first material 60 and a second material 62. In an embodiment, the first material 60 of the fiber 22 may be included in a first portion 52 of the fiber 22. The first portion 52 of the fiber 22 may comprise the fiber core 50 and which may extend along the longitudinal axis 36 of the fiber 22. The second material 62 of the fiber 22 may be included in one or more second portions 54 of the fiber 22. In an embodiment, the second portions 54 may be mounted or otherwise disposed on the fiber core 50. FIG. 13B is a sectional view of the fiber 22 taken along the longitudinal axis 36 of the fiber 22. Shown is the fiber core 50 formed of the first material 60 and having a fiber diameter 46. Shown also are a plurality of the second portions 54 formed of the second material 62 and mounted to the fiber core 50. FIG. 13C is a sectional view taken along the fiber core 50 and illustrating a first cross-sectional area 38a of the fiber core 50 and a first cross-sectional shape 40a the fiber core 50 formed as a circle.

Figure 13D:
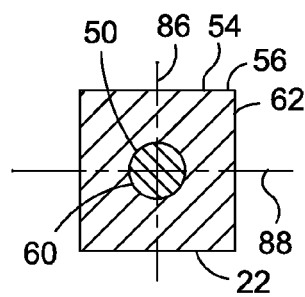
FIG. 13D is a sectional view of the fiber taken from FIG. 1B and illustrating one of the cube-shaped second portions formed of the second material.

FIG. 13D is a sectional view taken along a second portion 54 of the fiber 22 (FIG. 13A). In the embodiment shown, the second portion 54 has a second cross-sectional shape 40b formed as a square. In an embodiment, each one of the second portions 54 may be formed as a fiber bead 56 comprised of the second material 62 and mounted (e.g., bonded) to the fiber core 50. Although shown as having a square shape, the fiber beads 56 may be provided in any one of a variety of cross-sectional shapes. For example, the fiber beads 56 may be provided as spheres, square cubes, rectangular cubes, polygonal beads, irregularly-shaped beads, generally rounded beads, or any one of a variety of alternative sizes, shapes, and configurations.

Figure 14A:
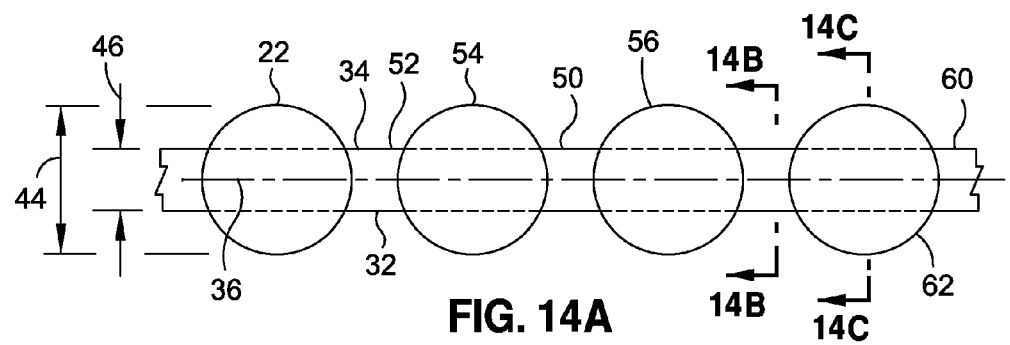
FIG. 14A is a top view of an alternative embodiment of a fiber having a fiber core formed of a first material and a series of spherically-shaped second portions formed of a second material.
Figure 14B:
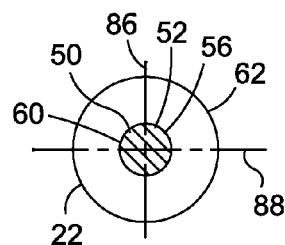
FIG. 14B is a sectional view of the fiber taken from FIG. 14A and illustrating the fiber core formed of the first material.
Figure 14C:
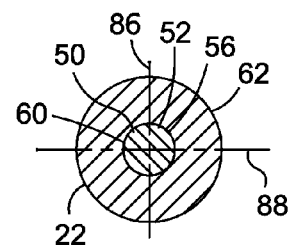
FIG. 14C is a sectional view of the fiber taken from FIG. 14A and illustrating one of the spherically-shaped second portions formed of the second material.

FIGS. 14A-14C illustrate an embodiment of the fiber 22 having fiber beads 56 which are spherical and which may be formed of a second material 62 mounted on a fiber core 50 formed of a first material 60. In an embodiment, the fiber beads 56 are represented by the cross-hatched area bounded by the outer square and the inner circle and may have a larger cross-sectional area 38 than the cross-sectional area 38 of the fiber core 50 which is represented by the crosshatched area within the circle.

Advantageously, forming the fiber 22 of at least two different materials provides an additional means for tailoring the degree of coupling of the fibers 22 to the matrix 18 (FIG. 4). For example, the first material 60 may interact with the matrix 18 in a manner that differs from the manner in which the second material 62 interacts with the matrix 18. In this regard, the first material 60 may result in different properties in the bond between the first material 60 and the matrix 18. For example, the first material 60 may provide different levels of strength, stiffness, ductility, strain-to-failure, and other properties in the adhesive bond between the first material 60 in the matrix 18 relative to the properties in the adhesive bond between the second material 62 and the matrix 18.

Referring to FIG. 15, shown is an embodiment of a fiber 22 wherein the fiber geometry 32 is variable in a semi-periodic 64 manner along the fiber length 34. For example, the fiber 22 may include groups of second portions 54 located at spaced intervals along the fiber length 34. The groups of second portions 54 may be separated by a section of the fiber 22 having a relatively smaller fiber width 44 or fiber diameter 46 and which may be of substantially constant cross-sectional area and/or substantially constant cross-sectional shape. The second portions 54 may be provided in any one of a variety of different cross-sectional shapes and cross-sectional areas including any one of the configurations disclosed herein. Advantageously, the groups of second portions 54 may be separated by relatively constant spacings or the spacing may be variable between two groups of second portions 54. The second portions 54 may be sized and positioned along the fiber length 34 to provide a desired level of mechanical coupling of the fibers 22 to the matrix. In an embodiment, the second portions 54 may be formed from a different material than the material of a smaller-diameter core 50 upon which the second portions 54 may be mounted. The different materials may provide different interactions between the fibers 22 and the matrix 18 (FIG. 3) and which may provide an additional means to control the coupling between the fibers 22 and the matrix 18.

In FIG. 15, the semi-periodic 64 arrangement of the fiber geometry 32 may be tailored or configured to provide for discretized control of the movement of the fibers 22 relative to the matrix along the fiber length 34. For example, for embodiments wherein it is desired to minimize the area of optical distortion in a composite article 10 due to impact by a projectile, the groups of second portions 54 may be spaced along the fiber length 34 in a manner that minimizes the extent of fiber involvement in the ballistic event (e.g., projectile impact). In this regard, the groups of second portions 54 may be provided at relatively small spacings from one another. In contrast, for embodiments wherein it is desired to maximize ballistic performance of the composite article 10 during impact by a projectile, the groups of second portions 54 may be provided at relatively large spacings from one another in a manner that maximizes the extent of fiber involvement in the ballistic event. In addition, the relative size and geometry of the second portions 54 may be tailored or configured to provide discretized or quantized control of the movement of the fibers 22 relative to the matrix.

In any of the embodiments disclosed herein, the cross-sectional shape of a fiber 22 may be provided in any one of a variety of different configurations. For example, the cross-sectional shape of a fiber 22 may comprise a circle, a closed semi-circle, an ellipsoid, a kidney shape, a triangle, a square, a rectangle, a polygon, or any one of a variety of different cross-sectional shapes. Furthermore, a fiber 22 may be configured in an embodiment comprising two or more different cross-sectional shapes formed along the fiber length. In addition, a fiber 22 may be provided in any irregular or random cross-sectional shape and is not limited to known geometric shapes. One or more of fibers 22 may also be provided in a generally hollow configuration such that the fibers 22 are not limited to a solid configuration. A fiber 22 may optionally include a cross-sectional shape having at least one pair of fiber surfaces 24 (FIGS. 5B, 6B, 8B, 9B, 10B) that are substantially parallel to one another. In addition, the fiber 22 may be provided in a cross-sectional shape (not shown) that combines substantially planar surfaces with curved surfaces.

In any of the embodiments disclosed herein, the matrix 18 (FIG. 4) and/or the fibers 22 (FIG. 4) may be formed of any suitable organic or inorganic material, thermoplastic material, thermosetting material, and/or glass material, without limitation. For example, the matrix 18 and/or fiber 22 including any one of the different materials that may be used in the fibers 22 may be formed of a thermoplastic material comprising at least one of the following materials: acrylics, fluorocarbons, polyamides (nylons), polyethylenes, polyesters, polypropylenes, polycarbonates, polyurethanes, polyetheretherketone, polyetherketoneketone, polyetherimides, stretched polymers and any other suitable thermoplastic material. Likewise, the matrix 18 and/or the fibers 22 including any one of the different materials that may be used in the fibers 22 may be formed of a thermoset which may include any one of the following: polyurethanes, phenolics, polyimides, bismaleimides, polyesters, epoxies, silsesquioxanes and any other suitable thermoset material. In addition, the matrix 18 and/or the fibers 22 may be formed of inorganic material including carbon, silicon carbide, boron, or other inorganic material. Even further, the matrix 18 and/or the fibers 22 may be formed of glass comprising E-glass (alumino-borosilicate glass), S-glass (alumino silicate glass), pure silica, borosilicate glass, optical glass, ceramics, glass ceramics, and any other glass material, without limitation. Additionally, the matrix 18 and/or the fibers 22 may at least partially comprise or include metallic material.

In an embodiment, the fibers 22 (FIG. 4) may be formed of a substantially optically transparent fiber material although the fibers 22 may be formed of substantially opaque material. The matrix 18 (FIG. 4) may also be formed of a substantially optically transparent polymeric matrix material or substantially opaque material. The fibers 22 in any of the embodiments disclosed herein may be formed as filament-based fibers, monofilament fibers, poly-component fibers, and other fiber configurations. In an embodiment, the fibers 22 may have a fiber thickness 42, a fiber width 44, and/or a fiber diameter 46 in the range of from approximately three (3) microns to 5000 microns. For example, the fibers 22 may have a fiber thickness 42, a fiber width 44, and/or a fiber diameter 46 in the range of from approximately three (3) microns to 100 microns. In a further embodiment, the fiber thickness 42, fiber width 44, and/or fiber diameter 46 may be in the range of from approximately 20 microns to 50 microns. However, the fibers 22 may be provided in a fiber thickness 42, fiber width 44, or fiber diameter 46 that is smaller than 3 microns or larger than 5000 microns.

The composite article 10 (FIG. 4) may be configured in any one of a variety of different shapes, sizes and configurations. In this regard, the composite article 10 may be configured for use in any vehicular or non-vehicular application. For example, the composite article 10 may be configured as a transparency of a vehicle such as an aircraft. The composite article 10 may also comprise any portion of a windshield or a canopy of an aircraft. The composite article 10 may also be configured for use in any portion of a window in any vehicular or non-vehicular application. Furthermore, the composite article 10 may be implemented in or incorporated into any portion of a membrane, an armor panel, a structural panel, an architectural panel, a non-structural panel or a non-structural article, a layered system, or in any other implementation of the composite article 10, without limitation.

Figure 16:
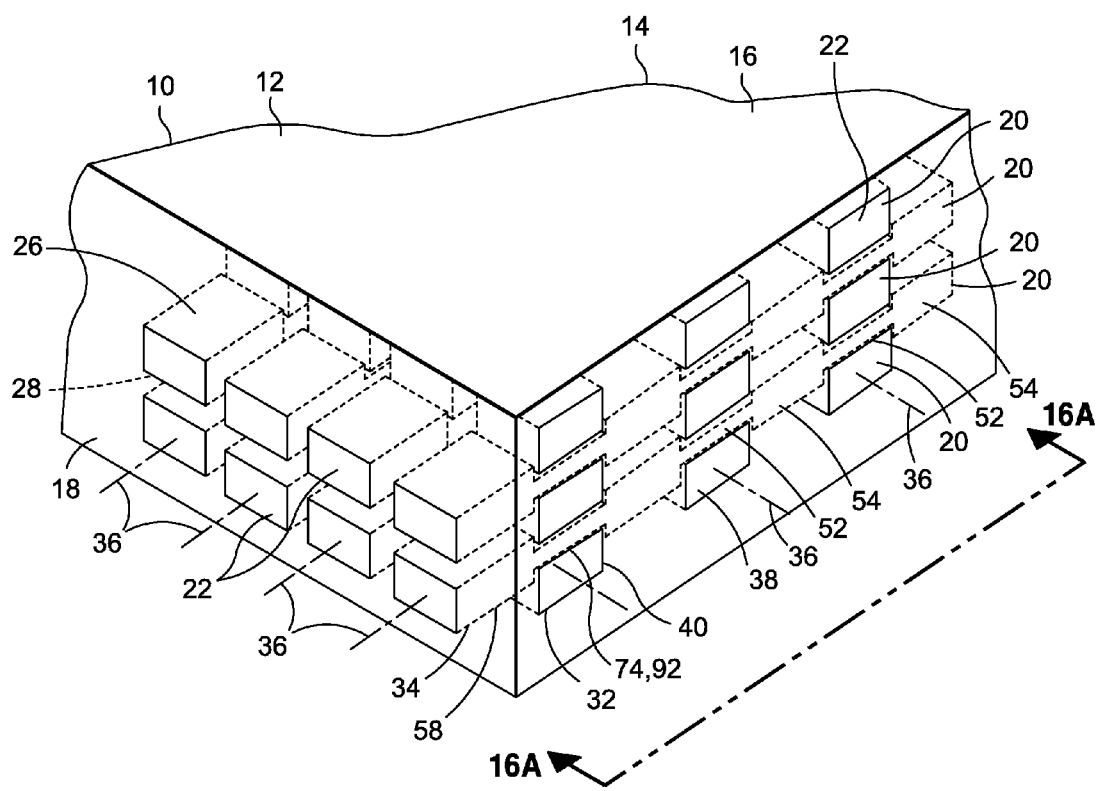
FIG. 16 is a perspective illustration of a portion of a composite article comprised of layers having fibers arranged orthogonally relative to the fibers in adjacent layers.

Referring to FIG. 16, shown is a portion of a composite article 10 having fibers 22 embedded in a matrix 18 and wherein the fibers 22 are positioned in side-by-side 70 arrangement in a plurality of layers 20. The fibers 22 in each layer 20 are oriented orthogonally relative to the fibers 22 in layers 20 adjacent thereto. The composite article 10 may facilitate engagement 92 of the fibers 22 by configuring the fibers 22 in one layer 20 to be complementary to the fibers 22 in the layers 20 located immediately adjacent thereto. In this regard, the fiber geometry 32 in each fiber 22 may be varied along the fiber length 34 such that the fibers 22 include first portions 52 and second portions 54 that alternate relative to one another. Upon application of a force 90 (FIG. 16B) substantially normal or oblique to the composite article 10, the second portions 54 of the fibers 22 in one layer 20 may at least partially nest within the fibers 22 in the layers 20 located immediately adjacent thereto.

Figure 16A:
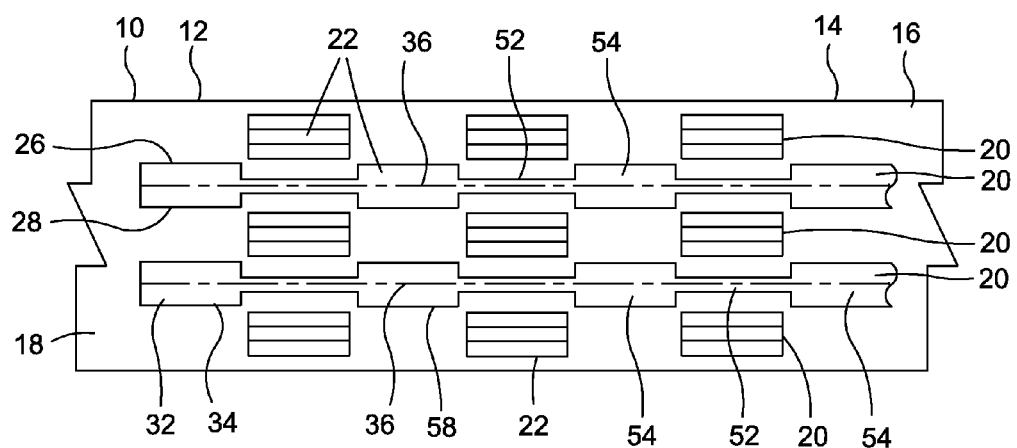
FIG. 16A is an end view of the composite article of FIG. 16 and illustrating the second portions of the fibers in alternating layers being generally aligned with the first portions of the fibers in adjacent layers.

FIG. 16A is an end view of the composite article 10 of FIG. 16 and showing the fibers 22 in alternating layers 20 being generally aligned with the first portions 52 of the fibers 22 in the layers 20 located immediately adjacent thereto. The fibers 22 in each layer 20 may initially be positioned either above or below a plane defined by a respective uppermost or lowermost surface of the fiber 22 in an immediately adjacent layer 20. For example, the bottom surface of the fiber 22 of the uppermost layer 20 in FIG. 16A may be located above a plane defined by the uppermost surface of the fibers 22 of the immediately-below layer 20.

Figure 16B:
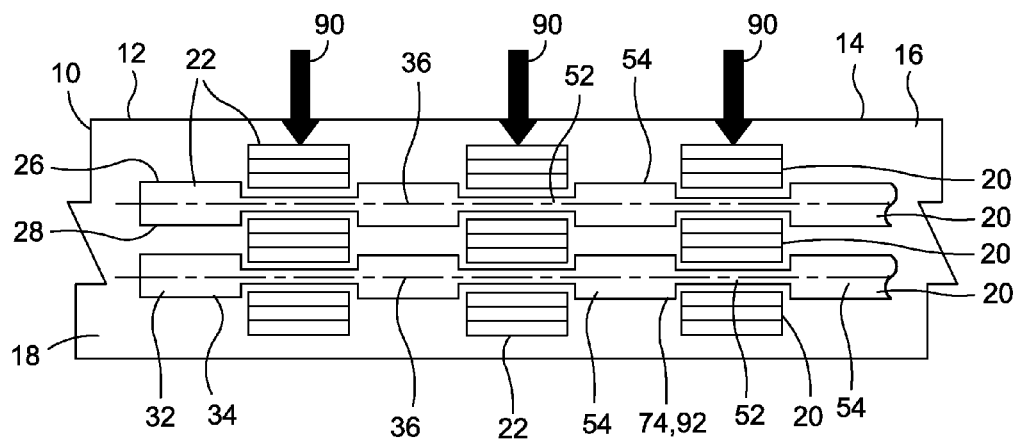
FIG. 16B is the end view of the composite article of FIG. 18A illustrating a normal force applied to the fibers causing engagement of the fibers oriented in one direction in a layer with the fibers oriented in a different direction (e.g., perpendicular) of an adjacent layer.

FIG. 16B is an end view of the composite article 10 of FIG. 16A illustrating a force 90 applied to the fibers 22. The force 90 may occur in response to an impact of a projectile with the composite article 10. As can be seen, the force 90 may cause the layers 20 to move closer together and may result in the engagement 92 of the fibers 22 with the fibers 22 in an immediately adjacent layer. In this regard, the second portions 54 of the fibers 22 in each layer 20 may become at least partially interlocked or at least partially nested 74 with the first portions 52 of the fibers 22 that are immediately adjacent. The engagement 92 or nesting of the fibers 22 may mechanically couple the fibers 22 of the layers 20 during a ballistic event such that a relatively large quantity of fibers 22 may be involved in a ballistic event.

In any of the embodiments disclosed herein, mechanical coupling of the fibers 22 with the matrix 18 (e.g., fiber-matrix coupling) due to varying the fiber geometry 32 of the fibers 22 along the fiber lengths 34 may result in an improvement in the ballistic performance and/or the optical performance of the composite article 10. In addition, mechanical coupling of fibers 22 with one another in the same layer 20 and mechanical coupling of fibers 22 in different layers 20 (e.g., in-plane fiber-to-fiber coupling and out-of-plane fiber-to-fiber coupling) may result in an improvement in the ballistic performance and/or the optical performance of the composite article 10. For example, during a ballistic event where a composite article 10 such as a composite panel 14 may be impacted by a projectile, the ability of the fibers 22 to move longitudinally along the length of the fiber 22 may affect the ballistic performance of the composite panel 14.

As mentioned above, the ability of the fibers 22 in the matrix 18 to move longitudinally along the fiber length 34 relative to the matrix 18 may improve the ability of the fibers 22 to stretch longitudinally prior to fiber 22 failure. The ability of the fibers 22 to move or slip relative to one another may also improve the ability of the fibers 22 to stretch longitudinally. The ability of the fibers 22 to stretch longitudinally may increase the ability of the fibers 22 to absorb energy of a projectile during impact with the composite panel 14. An increase in the energy-absorbing capability of the fibers 22 may improve the ballistic performance of the composite panel 14 by improving resistance of the composite panel 14 to penetration by the projectile 112.

For composite panels 14 that are substantially transparent, movement of the fibers 22 relative to the matrix 18 and movement of the fibers 22 relative to one another may also affect the optical performance of the composite panel 14 following impact by a projectile. For example, an increase in the energy-absorbing capability of the fibers 22 may result in a decrease in the size of the area around an impact site 116 (FIG. 17). In contrast, providing the fibers 22 with an increased ability to move relative to the matrix 18 and relative to one another may decrease the post-impact optical performance of a composite panel 14. The decrease in the post-impact optical performance of a composite panel 14 may be characterized by an increase in the size of the area around an impact site 116.

Referring to FIG. 17, shown is a side view of a test article 100 during impact of projectile 112 against a front side 104 of the test article 100. The test article 100 may be constructed in a manner similar to the embodiments of the composite article 10 (FIG. 1) described above wherein a plurality of fibers 110 are embedded in a matrix 108. As indicated above, the fibers 110 may have a fiber geometry 32 (FIG. 4) that varies along the fiber lengths 34 (FIG. 4) of the fibers 110. The impact of the projectile 112 against the front side 104 occurs at an impact site 116 of the article surface 102.

FIG. 18 shows a back side 106 of the test article 100 of FIG. 17 and illustrating a relatively large area of local and global involvement of the fibers 110 due to a relatively small amount of fiber-to-matrix coupling and/or fiber-to-fiber coupling in response to the impact of the projectile 112 against the front side 104 of the test article in FIG. 17. In FIG. 18, the local involvement 122 of the fibers 110 includes the portion of the fibers 110 in the area immediately surrounding the impact site 116 on the opposite (i.e., front side 104) of the test article 100. The global involvement 124 of the fibers 110 can be seen extending generally away from the impact site 116. The relatively large extent of the global involvement 124 may be due to a relatively small amount of fiber-to-matrix coupling and/or fiber-to-fiber coupling in response to the impact of the projectile 112 against the front side 104 of the test article 100.

FIG. 19 is a view of the back side of a test article having a relatively small area of local and global involvement of the fibers due to an increased amount of fiber-to-matrix coupling and/or fiber-to-fiber coupling relative to the coupling occurring in FIG. 18. In FIG. 19, the increased amount of fiber-to-matrix coupling and/or fiber-to-fiber coupling may be achieved by increasing the magnitude of the variations in fiber geometry along the fiber length of the fibers. Increased fiber-to-matrix coupling and/or fiber-to-fiber coupling may also be achieved by decreasing the spacings between the adjacent second portions or between groups of the second portions in the semi-periodic 64 arrangement shown in FIG. 15.

Figure 21:
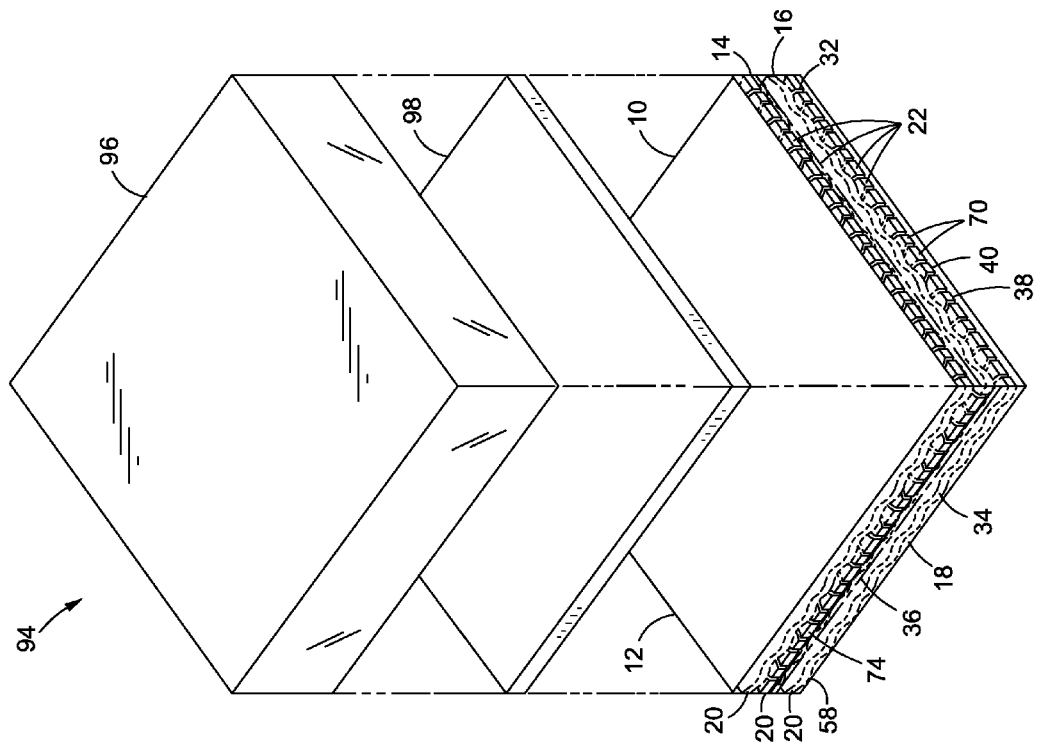
FIG. 21 is an exploded perspective illustration of the layered system of FIG. 20.
Figure 20:
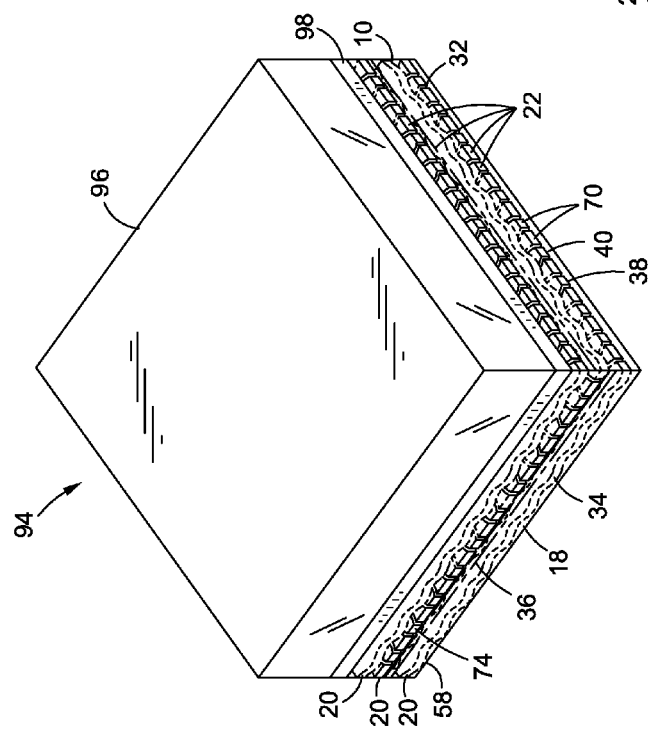
FIG. 20 is a perspective view of a layered system comprising a first layer, a second layer, and the composite article.

FIGS. 20-21 are perspective views of a layered system 94 wherein the composite article 10 may be mounted in stacked formation with a first layer 96 and a second layer 98. In an embodiment, the first layer 96 may be comprised of ceramic and/or glass material or other material and may comprise a strike face (not shown) of the layered system 94. The second layer 98 may be formed as a relatively high-stiffness composite layer (not shown) and may be mounted adjacent to the first layer 96. The composite article 10 may be mounted on a side of the second layer 98 opposite the first layer 96 such that the composite article 10 is located on a back face or a back side of the layered system 94.

Although FIGS. 20-21 illustrate a single one of the composite articles 10 located on a back side of the layered system 94, any number of composite articles 10 may be provided. Furthermore, although only a single one of the first layers 96 and a single one of the second layers 98 are shown in FIGS. 20-21, any number of first layers 96 and second layers 98 may be provided in combination with any number of composite articles 10. Even further, a layered system 94 may be formed comprising only a first layer 96 and a composite article 10. In an embodiment, the layered system 94 may comprise an armor panel. However, the layered system 94 may be incorporated into any article, without limitation, and is not limited to an armor panel.

The first layer 96 may be comprised of a material that preferably has relatively high hardness and relatively high stiffness such as a monolithic layer of ceramic and/or glass. However, the first layer 96 may be formed in a variety of alternative materials which are preferably relatively stiff and relatively hard. The first layer 96 may be configured to function as a strike face for ballistic applications. For example, the first layer 96 may be configured to be impacted by a projectile.

The second layer 98 may be located adjacent to the first layer 96 as shown in FIGS. 20-21. The second layer 98 may be formed as a relatively high-stiffness composite layer (not shown). The second layer 98 may include glass fibers (not shown) embedded in a matrix (not shown). Alternatively, the second layer 98 may be comprised of one or more glass layers or sheets such as one or more monolithic sheets of glass. The second layer 98 may also be formed as a high stiffness composite layer (not shown) comprised at least partially of glass fibers (not shown) formed of high strength and/or high stiffness polymeric material such as ultra high density polyethylene and which may be embedded within a matrix (not shown). The combination of the first layer 96, the second layer 98, and the composite article 10 collectively forms the stiffened layered system 94 which provides relatively high global stiffness to the first layer 96 and improves the ballistic performance of the layered system 94.

Figure 22:
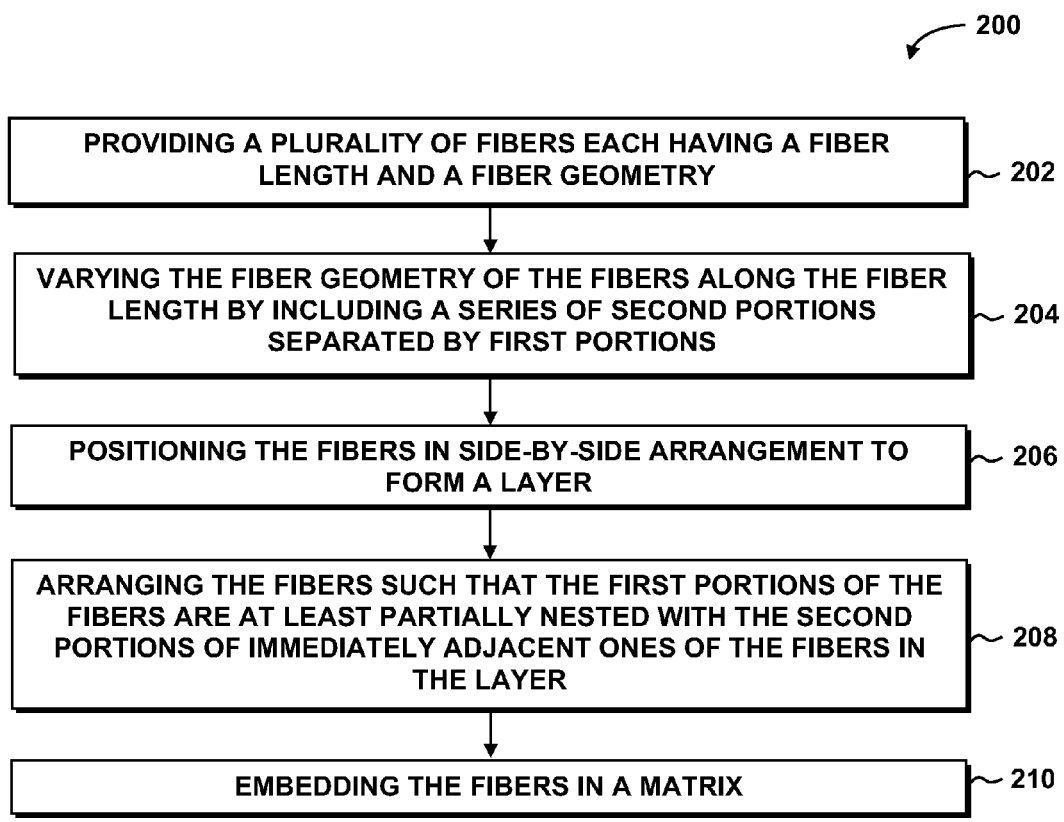
FIG. 22 is a flow chart illustrating one or more operations that may be included in a method for manufacturing a composite article.

Referring to FIG. 22, shown is a flow chart illustrating one or more operations that may be implemented in a method 200 for manufacturing a composite article 10 (FIG. 1). Step 202 of the method 200 may include providing a plurality of fibers 110 (FIG. 18) wherein each fiber 22 (FIGS. 5A-13A) has a fiber length 34 (FIGS. 5A-13A) and a fiber geometry 32 (FIGS. 5A-13A).

Step 204 may comprise varying the fiber geometry 32 (FIGS. 5A-14C) of the fibers 22 (FIGS. 5A-13A) along the fiber length 34 (FIGS. 5A-14C). For example, the fiber geometry 32 may be varied along the fiber length 34 by including a series of second portions 54 (FIG. 4) separated by first portions 52 (FIG. 4) along the fiber length 34. In an embodiment, the fiber geometry 32 may be varied in a periodic 58 (FIG. 4) manner along the fiber length 34. However, the fiber geometry 32 may be also varied in a semi-periodic or in a non-periodic manner.

The fiber geometry 32 (FIGS. 5A-14C) may be varied by varying the cross-sectional shape 40 (FIG. 3) of the fibers 22 along the fiber length 34 (FIGS. 5A-14C) and/or by varying the cross-sectional area 38 (FIG. 3) of the fibers 22 (FIGS. 5A-14C) along the fiber length 34. In a further embodiment, the fiber geometry 32 may be varied by offsetting the cross-sectional shape 40 of the fibers 22 on alternating sides of the longitudinal axis 36 (FIG. 3) as described above or by altering the orientation of the cross-sectional shape 40 along the fiber length 34. In an embodiment, the fibers 22 may be provided with a serpentine shape 78 (FIG. 8A) or in a helix shape 80 (FIG. 10A) or in other shapes. The fibers 22 may be formed of one or more materials as described above in order to attain different interactions between the fibers 22 and the matrix 18 (FIG. 3) and which may affect the coupling between the fibers 22 and the matrix 18.

Step 206 of the method 200 may comprise positioning the fibers 22 (FIGS. 5A-14C) in side-by-side 70 (FIG. 3) arrangement to form a layer 20 such as the layers 20 shown in FIGS. 1-3 and 14-14C. However, the fibers may be positioned in non-parallel relation to one another. Furthermore, although not shown, the fibers may be provided in a woven fabric when the fibers are oriented at one or more of a variety of angles relative to one another. In an embodiment, the fibers 22 may include a series of second portions 54 (FIG. 4) interconnected by first portions 52 (FIG. 4) as described above.

Step 208 may comprise arranging the fibers 22 such that the second portions 54 of the fibers 22 are at least partially nested 74 (FIG. 4) with the first portions 52 of immediately adjacent ones of the fibers 22 in the layer 20. For example, FIG. 4 illustrates the positioning of the fibers 22 in a layer 20 such that the second portions 54 of the fibers 22 in the layer 20 are at least partially nested with the first portions 52 of the fibers 22 immediately adjacent thereto in the layer 20. In embodiments not shown, the second portions 54 of the fibers 22 in one layer 20 may be configured to at least partially nest with first portions 52 of the fibers 22 in an adjacent one of the layers 20 of a composite article 10.

Step 210 may comprise embedding the fibers 22 in a matrix 18 (FIG. 4) and curing or solidifying the matrix 18 to form the composite article 10 (FIG. 4). Advantageously, the variation in fiber geometry 32 along the fiber length 34 of the fibers 22 may facilitate fiber-to-matrix mechanical coupling and/or fiber-to-fiber mechanical coupling as a means to tailor the degree of relative fiber movement such as during a ballistic event. By tailoring the degree of fiber movement relative to the matrix and relative to other fibers, ballistic performance and post-impact optical performance of a composite article may be controlled or improved.

In an embodiment, the composite article 10 (FIG. 1) may be configured to provide enhanced structural performance due to the use of fibers 22 having fiber geometry 32 that varies periodically or semi-periodically along the fiber length 34. For example, by forming the composite article 10 from fibers 22 with along-the-length variations in cross-sectional area, cross-sectional shape, and/or orientation, the damage tolerance of the composite article 10 and resistance to crack growth may be improved relative to the damage tolerance and resistance to crack growth of a conventional composite article formed of fibers that have generally non-varying geometry along the fiber length.

Advantageously in the presently disclosed composite article 10 (FIG. 1), variations in fiber geometry 32 along the fiber length 34 may result in some amount of crack deflection in the matrix 18 material. In this regard, the varying of the fiber geometry 32 may cause a crack in the matrix 18 of the composite article 10 to propagate along a torturous path instead of propagating along a generally straight path. Propagation along a tortuous path may result in the suppression of crack growth in the matrix 18 relative to crack growth in the matrix of a conventional composite article having conventional fibers with fiber geometry that is generally non-varying along the fiber length. Such non-varying fiber geometry of conventional fibers may include a substantially continuous or constant cross-sectional shape, a substantially continuous or constant cross-sectional area, and/or a substantially continuous or constant orientation of the cross-sectional shape. The conventional fibers may also be formed of a substantially constant material type along the fiber length.

In an embodiment, the composite article 10 (FIG. 1) disclosed herein may include fibers 22 having fiber geometry 32 that varies in a manner causing a matrix crack to propagate along a tortuous path through one layer 20 or through multiple layers 20. In this regard, the variations in fiber geometery along the fiber length 34 may improve the intralaminar (e.g. within one layer) toughness and/or the interlaminar (e.g., between adjacent layers) toughness of the composite article 10 relative to a conventional composite article having conventional fibers with generally non-varying fiber geometry. Improvements in intralaminar toughness may represent a general increase in resistance to matrix crack propagation within a layer 20 and/or improved resistance to crack propagation at a de-bond of the fiber-matrix interface. Improvements in interlaminar toughness may represent a general increase in resistance to delamination of adjacent layers 20. In an embodiment, the fiber geometry 32 of the fibers 22 may be varied in a manner causing an increase in the mode I interlaminar fracture toughness and/or an increase in the mode II interlaminar fracture toughness. Mode I interlaminar fracture toughness may be characterized as the resistance to an opening force or a peeling force oriented along a direction generally normal to adjacent layers 20 of the composite article 10. Mode II interlaminar fracture toughness may be characterized as the resistance to a shearing force oriented generally parallel to adjacent layers 20 of the composite article 10.

In the composite article 10 disclosed herein, the fibers 22 may be configured such that the varying geometry may suppress crack growth or crack propagation in a manner which improves the damage tolerance of the composite article. Damage tolerance may be measured as an increase in compression-after-impact strength and/or an increase in open-hole compression strength. An increase in compression-after-impact strength may represent an improvement in residual strength of the composite article 10 following a relatively low-velocity impact of an object against the composite article. Non-limiting examples of low-velocity impacts may include an impact due to a dropped tool or impact of flying debris against the composite article 10 when in service. An increase in open-hole compression strength may represent an increase in the buckling strength of the composite article 10 when loaded in compression.

Figure 24:
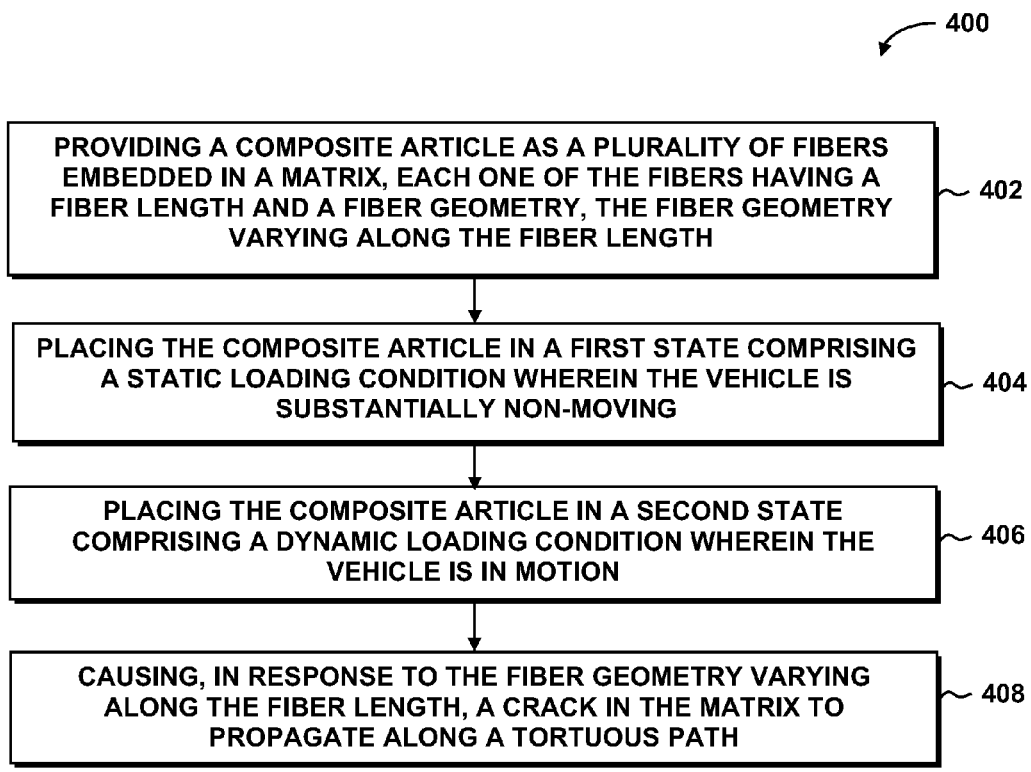
FIG. 24 is a flow chart illustrating an embodiment of a method of using the composite article.

Referring to FIG. 24, shown is a method 400 of implementing the composite article 10 (FIG. 1) in use such as in a vehicle (not shown). The method 400 of using the composite article 10 may include step 402 of providing the composite article 10 as a plurality of fibers 22 (FIG. 1) embedded in a matrix 18 (FIG. 1) as described above wherein each one of the fibers 22 has a fiber length 34 (FIG. 1) and a fiber geometry 32 (FIG. 1) and wherein the fiber geometry 32 varies along the fiber length 34.

Figure 23:
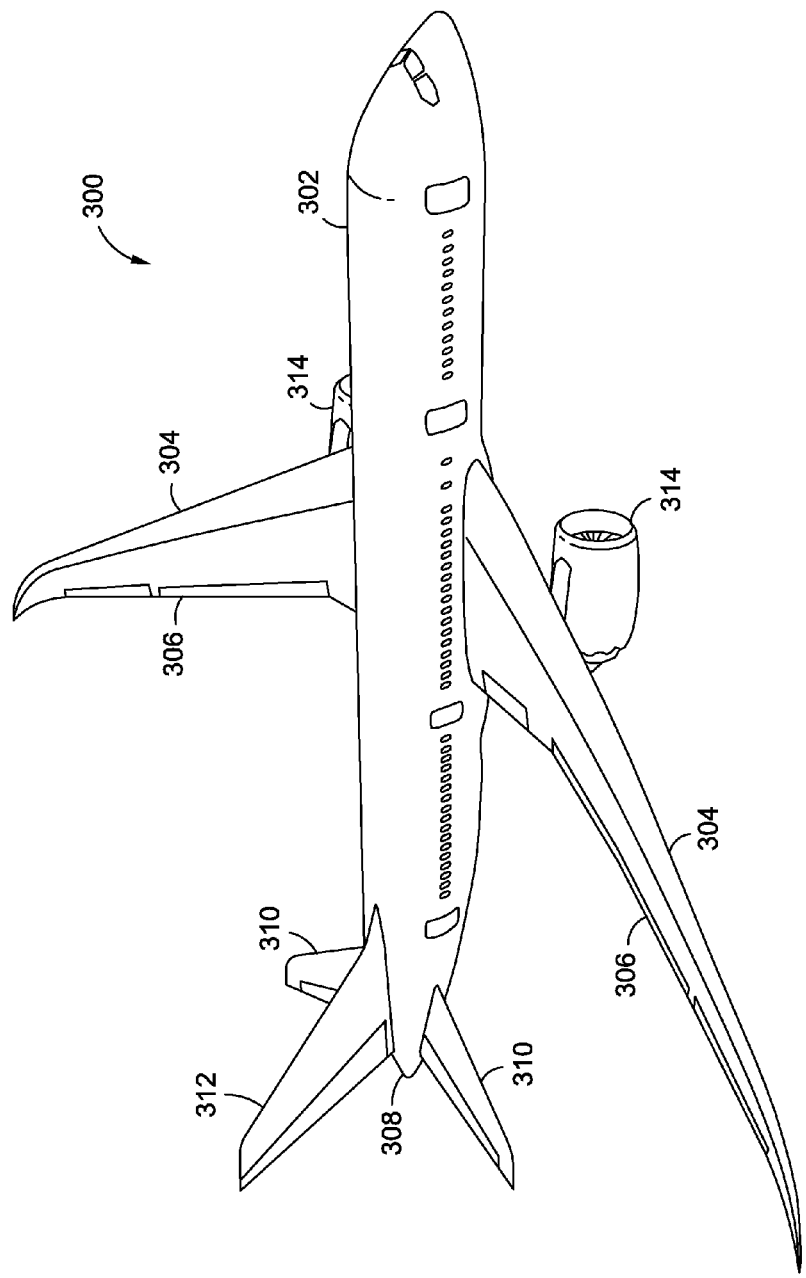
FIG. 23 is a perspective illustration of an aircraft which may incorporate the composite article in one or more embodiments.

The method 400 of FIG. 24 may further include step 404 of placing the composite article 10 (FIG. 1) such as a composite panel 14 (FIG. 1) in a first state in a vehicle that is substantially non-moving. The composite panel 14 may be subjected to a static loading condition (not shown). In an embodiment, the vehicle may comprise an aircraft on the ground such as when parked at a gate of an airport terminal. Referring to FIG. 23, shown is a perspective illustration of an aircraft 300 which may incorporate one or more embodiments of the composite article 10 (FIG. 1) as disclosed herein. The aircraft 300 may include a fuselage 302 having a pair of wings 304 and a tail section 308 which may include a vertical stabilizer 312 and horizontal stabilizers 310. The aircraft 300 may further include control surfaces 306 and propulsion units 314. The aircraft 300 may be generally representative of one of a variety of vehicles that may incorporate one or more of the composite articles 10 as described herein.

In an embodiment, the composite article 10 (FIG. 1) may comprise a composite panel 14 (FIG. 1) that may be at least partially transparent and/or at least partially opaque. In the static loading condition, loads on the composite panel 14 may be limited to loads due to gravitational force acting on a mass of the composite panel 14. Loads may also include compression loads due to mounting of the composite panel 14 to the vehicle. Static loads may also include tension loads, shear loads, and/or torsional loads acting on the composite panel 14 due to mounting of the composite panel 14 in the vehicle or due to other phenomena such as differential heating of the adjacent structure or due to other causes.

The method 400 of FIG. 24 may further include step 406 of subjecting the composite panel 14 (FIG. 1) to a second state wherein the vehicle may be in motion and/or the composite panel 14 may be subjected to a dynamic loading condition (not shown). For example, the vehicle may comprise the aircraft 300 (FIG. 23) in motion on a runway during takeoff. In the dynamic loading condition, loads on the composite panel 14 may include any one of compression loads, tension loads, shear loads, torsion loads, or any combination thereof. The loads may also include localized loads acting on the composite panel 14 due to impact by a projectile or by flying debris. As indicated above, the lengthwise variations in fiber geometry 32 of the composite panel 14 may facilitate mechanical coupling between the fibers 22 (FIG. 1) and the matrix 18 (e.g., fiber-matrix coupling) and/or between adjacent fibers 22 (e.g., fiber-to-fiber coupling) in one or more of the layers 20 (FIG. 1) that make up the composite panel 14. The mechanical coupling may provide a means to control the fiber-to-matrix movement and/or fiber-to-fiber movement which may increase the ability to decelerate a projectile impacting the composite panel 14.

The method 400 of FIG. 24 may further include step 408 of causing any cracks (not shown) in the matrix 18 to propagate along a tortuous path (not shown) due to the lengthwise variations in fiber geometry 32 of the fibers 22 in the composite panel 14. In this regard, the directions of the tortuous path may be defined by the variations in the fiber geometry 32 of the fibers 22. The tortuous path of crack propagation may improve the intralaminar (e.g. within one layer) fracture toughness and/or the interlaminar (e.g., between adjacent layers) fracture toughness of the composite panel 14. In this regard, the tortuous crack propagation may improve the compression-after-impact strength of the composite panel 14 when the composite panel 14 is impacted by a relatively low velocity impact such as due to impact by a tool, or runway debris or gravel in the case of the aircraft 300 (FIG. 23) in motion during takeoff or landing. Furthermore, the tortuous crack propagation may improve the open-hole compression strength of the composite panel 14 resulting in an increase in the buckling strength of the composite panel 14 under a compression load.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composite article, comprising:
   a matrix;
   a plurality of fibers embedded in the matrix;

each one of the fibers having a fiber length, a longitudinal axis, and a fiber geometry;
at any point along the fiber length, the fiber having material on both sides of the longitudinal axis;
the fiber geometry varying along the fiber length in a manner such that at least a portion of the fiber includes first portions and second portions comprising changes in cross-sectional area along the longitudinal axis and/or changes in cross-sectional shape along the longitudinal axis; and
the plurality of fibers being arranged such that the second portions of one of the fibers are at least partially nested, or are configured to be nested in response to a force causing the fibers to move closer together, with the first portions of an adjacent one of the fibers in a same layer and/or in an adjacent layer.

2. The composite article of claim 1, wherein:
the cross-sectional area is offset relative to the longitudinal axis at different locations along the fiber length.

3. The composite article of claim 1, wherein:
the cross-sectional shape has a transverse axis; and
the transverse axis having an orientation that varies along the fiber length.

4. The composite article of claim 1, wherein:
the fiber is comprised of a first material and a second material.

5. The composite article of claim 1, wherein at least one of the matrix and the fiber is formed from at least one of the following:
a thermoplastic material comprising at least one of the following: acrylics, nylon, fluorocarbons, polyamides, polyethylenes, polyesters, polypropylenes, polycarbonates, polyurethanes, polyetheretherketone, polyetherketoneketone, polyetherimides, stretched polymers;
a thermoset comprising at least one of the following: polyurethanes, phenolics, polyimides, bismaleimides, polyesters, epoxies, silsesquioxanes;
inorganic material comprising at least one of the following: carbon, silicon carbide, boron; and
glass comprising E-glass (alumino-borosilicate glass), S-glass (alumino silicate glass), pure silica, borosilicate glass, optical glass, ceramics, glass ceramics.

6. The composite article of claim 1 wherein:
the fibers are at least one of opaque and substantially optically transparent; and
the matrix being at least one of opaque and substantially optically transparent.

7. The composite article of claim 1, wherein the composite article is included in at least one of the following:
a windshield, a canopy, a window, a membrane, an armor panel, a structural panel, an architectural panel, a non-structural article, a layered system.

8. The composite article of claim 1, wherein:
the fibers are arranged in the matrix such that a variation in the fiber geometry along the fiber length causes a crack in the matrix to propagate along a tortuous path; and
the tortuous path causing a suppression of crack growth in the matrix relative to crack growth in a matrix of a composite article having fibers with generally non-varying fiber geometry along the fiber length.

9. The composite article of claim 8, wherein the tortuous path extends at least partially within at least one of the following:
matrix material in a layer of the fibers; and
matrix material between adjacent layers.

10. The composite article of claim 8, wherein the fiber geometry of the fibers varies in a manner causing an increase in at least one of the following:
damage tolerance;
mode I interlaminar fracture toughness; and
mode II interlaminar fracture toughness.

11. A method of manufacturing a composite article, comprising the steps of:
providing a plurality of fibers each having a fiber length, a longitudinal axis, and a fiber geometry, the fiber having material on both sides of the longitudinal axis at any point along the fiber length, at least one of the fibers having a fiber geometry that varies along the fiber length in a manner such that at least a portion of the fiber includes first portions and second portions comprising changes in cross-sectional area along the longitudinal axis and/or changes in cross-sectional shape along the longitudinal axis, the plurality of fibers being arranged such that the second portions of one of the fibers are at least partially nested, or are configured to be nested in response to a force causing the fibers to move closer together, with the first portions of an adjacent one of the fibers in a same layer and/or in an adjacent layer; and
embedding the fibers in a matrix.

12. The method of claim 11 further comprising the step of:
varying a cross-sectional shape of the fibers along the fiber length.

13. The method of claim 11 further comprising the step of:
varying a cross-sectional area of the fibers along the fiber length.

14. The method of claim 11 further comprising the step of:
offsetting a cross-sectional shape of the fibers relative to a longitudinal axis thereof 15. The method of claim 11 further comprising the step of:
forming the fibers of a first material and a second material.

16. The method of claim 11 further comprising the steps of:
arranging the fibers in side-by-side arrangement for forming a layer, each one of the fibers having a series of second portions separated by first portions; and
positioning the fibers such that the second portions of one of the fibers in the layer are at least partially nested with the first portions of an immediately adjacent one of the fibers in the layer.

17. A composite article, comprising:
a substantially optically transparent polymeric matrix;
a plurality of substantially optically transparent fibers embedded within the matrix, each one of the fibers including:
a fiber length, a longitudinal axis, and a fiber geometry;
at any point along the fiber length, the fiber having material on both sides of the longitudinal axis;
the fiber geometry varying along at least a portion of the fiber length in a manner such that at least a portion of the fiber includes first portions and second portions comprising changes in cross-sectional area along the longitudinal axis and/or changes in cross-sectional shape along the longitudinal axis; and
the second portions of the fiber are at least partially nestable with the first portions of an adjacent fiber in a same layer and/or in an adjacent layer.

18. The fiber of claim 17, wherein:
the fiber geometry has a cross-sectional area; and
the cross-sectional area being variable along the fiber length.

19. The fiber of claim 17, wherein:
the fiber geometry has a cross-sectional shape; and the cross-sectional shape being variable along the fiber length.

20. The fiber of claim 19, wherein:
the fiber geometry has a cross-sectional area; and
the cross-sectional area being substantially constant along the fiber length.

21. The fiber of claim 17, wherein:
the fiber has a longitudinal axis extending along the fiber length;
the fiber geometry has a cross-sectional area; and
the cross-sectional area being offset relative to the longitudinal axis at different locations along the fiber length.

22. The fiber of claim 17, wherein:
a variation in the fiber geometry comprises a series of the first portions and the second portions along the fiber length.

23. The fiber of claim 17, wherein:
the fibers have a fiber thickness in a range of from approximately 3 microns to 5000 microns.

24. A method of loading a composite article of a vehicle, comprising the steps of:
providing the composite article as a plurality of fibers embedded in a matrix, each one of the fibers having a fiber length, a longitudinal axis, and a fiber geometry, the fiber having material on both sides of the longitudinal axis at any point along the fiber length, the fiber geometry varying along the fiber length in a manner such that at least a portion of the fiber includes first portions and second portions comprising changes in cross-sectional area along the longitudinal axis and/or changes in cross-sectional shape along the longitudinal axis, the plurality of fibers being arranged such that the second portions of one of the fibers are at least partially nested, or are configured to be nested in response to a force causing the fibers to move closer together, with the first portions of an adjacent one of the fibers in a same layer and/or in an adjacent layer;
placing the composite article in a first state comprising a static loading condition; and
placing the composite article in a second state comprising a dynamic loading condition.

25. The method of claim 24, further comprising the step of:
causing, in response to the fiber geometry varying along the fiber length, a crack in the matrix to propagate along a tortuous path.

26. The method of claim 24, wherein:
the static loading condition is associated with a vehicle being substantially non-moving; and
the dynamic loading condition is associated with the vehicle in motion.

27. The fiber of claim 17, wherein:
the fiber geometry varies in a semi-periodic manner along at least a portion of the fiber length;
the semi-periodic variation comprising groups of second portions located at spaced intervals along the fiber length and separated by at least one section of the fiber having a smaller fiber width that the fiber width of one of the second portions.

* * * * *